(12) United States Patent
Tang et al.

(10) Patent No.: US 12,656,527 B2
(45) Date of Patent: Jun. 16, 2026

(54) SYSTEMS AND METHODS FOR FACILITATING OPERATIONS OF A WELL IN AN UNCONVENTIONAL RESERVOIR

(71) Applicant: Chevron U.S.A. Inc., San Ramon, CA (US)

(72) Inventors: Yula Tang, Midland, TX (US); Yuanbo Lin, Midland, TX (US); Suk Kyoon Choi, Katy, TX (US); Jianlei Sun, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 323 days.

(21) Appl. No.: 18/325,277

(22) Filed: May 30, 2023

(65) Prior Publication Data

US 2024/0402383 A1 Dec. 5, 2024

(51) Int. Cl.
*G01V 20/00* (2024.01)
*E21B 47/06* (2012.01)
*E21B 47/10* (2012.01)

(52) U.S. Cl.
CPC .............. *G01V 20/00* (2024.01); *E21B 47/06* (2013.01); *E21B 47/10* (2013.01); *E21B 2200/20* (2020.05)

(58) Field of Classification Search
CPC ......... G01V 20/00; E21B 47/06; E21B 47/10; E21B 2200/20
See application file for complete search history.

(56) References Cited

U.S. PATENT DOCUMENTS

| | | | | |
|---|---|---|---|---|
| 11,514,216 | B1 | 11/2022 | Sankaran | |
| 2021/0310345 | A1 * | 10/2021 | Aqeel | ................... E21B 47/138 |
| 2023/0272703 | A1 | 8/2023 | Choi | |

FOREIGN PATENT DOCUMENTS

| | | | | |
|---|---|---|---|---|
| CA | 2762975 | | 11/2010 | |
| CA | 2888205 | | 5/2014 | |
| CN | 106869917 | | 6/2017 | |
| CN | 109958431 | | 7/2019 | |
| EP | 3347567 | B1 * | 8/2023 | ............. E21B 41/00 |
| NO | 20240464 | A1 * | 5/2024 | ............. E21B 43/00 |
| WO | 2014074474 | | 5/2014 | |
| WO | WO-2022256485 | A1 * | 12/2022 | ............. E21B 44/00 |

OTHER PUBLICATIONS

A. Sajedian; "Two-phase Inflow Performance Relationship Prediction Using Two Artificial Intelligence Techniques: Multi-layer Perceptron Versus Genetic Programming"; Petroleum Science and Technology; 10.1080/10916466.2010.509074; Jul. 2, 2012 (12 pages).

(Continued)

*Primary Examiner* — Thomas K Pham
(74) *Attorney, Agent, or Firm* — Esplin & Associates, PC

(57) ABSTRACT

A hybrid modeling approach incorporates both physics-based reservoir modeling and machine learning technique to capture dynamic behavior of unconventional wells. Shut-in bottom hole pressure for unconventional wells are simulated for use as proxy for reservoir pressure in unconventional reservoirs. Production parameters for unconventional wells (e.g., gas/oil ratio, water cut, flowing bottom hole pressure, shut-in bottom hole pressure, productivity index) are determined for use in controlling the operations of unconventional wells.

20 Claims, 10 Drawing Sheets

(56)          References Cited

OTHER PUBLICATIONS

Abdelmjeed Mohamed; "A Robust Model to Predict the Inflow Performance Relationship IPR of Hydraulically-Fractured Horizontal Wells in Gas Reservoirs" International Petroleum Technology Conference; IPTC-20153-MS; Jan. 13, 2020 (10 pages).

Ayoub Joseph; "Production Operations Efficiency Gains Enablers: Machine Learning or Physics Based Models?"; Offshore Technology Conference; SPE-201501-MS; Oct. 19, 2020 (16 pages).

Cenk Temizel; "Production Forecasting in Shale Reservoirs through Conventional DCA and Machine/Deep Learning Methods"; SPE/AAPG/SEG Unconventional Resources Technology Conference; URTEC-2020-2878-MS; Jul. 20, 2020 (52 pages).

H.J. Park; "Applications of Advanced Polynomial Neural Networks for Prediction of Multi-well Reservoir Performance"; Energy Sources, Part A: Recovery, Utilization, and Environmental Effects; 10.1080/15567030600828867; Feb. 5, 2008 (12 pages).

Halit Apaydin; "Comparative Analysis of Recurrent Neural Network Architectures for Reservoir Inflow Forecasting"; Water; 10.3390/w12051500; May 2020 (18 pages).

Iman Al Selaiti; "Robust Data Driven Well Performance Optimization Assisted by Machine Learning Techniques for Natural Flowing and Gas-Lift Wells in Abu Dhabi" Society of Petroleum Engineers; SPE-201696-MS; Oct. 19, 2020 (27 pages).

Kyungbook Lee; "Prediction of Shale-Gas Production at Duvernay Formation Using Deep-Learning Algorithm"; SPE Journal; SPE-195698-PA; Jul. 19, 2019 (15 pages).

M. Alrumah; "Predicting Well Inflow Performance in Solution Gas Drive Reservoir by Neural Network"; Canadian International Petroleum Conference; PETSOC-2005-106; Jun. 7, 2005 (9 pages).

M. Ebrahimi, "Use of Fuzzy Logic for Predicting Two-Phase Inflow Performance Relationship of Horizontal Oil Wells"; Trinidad and Tobago Energy Resources Conference; SPE-133436-MS; Jun. 27, 2010 (10 pages).

M. Taghi Sattari; "Performance evaluation of artificial neural network approaches in forecasting reservoir inflow"; Applied Mathematical Modeling; 10.1016/j.apm.2011.09.048; Jun. 2012 (9 pages).

Mario Antonio del Pino Fiorillo; "Using Machine Learning for Building Multivariate IPR Models from High Frequency Streaming Data"; Society of Petroleum Engineers; SPE-199132-MS; Jul. 20, 2020 (20 pages).

Mohamed Mehana; "Machine-learning predictions of the shale wells' performance"; Journal of Natural Gas Science and Engineering; 10.1016/j.jngse.2021.103819; Apr. 2021 (9 pages).

Mohammad (Jabs) Aljubran; "Prediction of Multilateral Inflow Control Valve Flow Performance Using Machine earning"; SPE Production and Operations; SPE-196003-PA; Aug. 13, 2020 (19 pages).

Palash Panja; " Application of artificial intelligence to forecast hydrocarbon production from shales"; Petroleum; 10.1016/j.petlm.2017.11.003; Mar. 2018 (15 pages).

S. H. Tabatabaie; "Generate Inflow Performance Relationships (IPR) for Unconventional Reservoirs using Reservoir Models Instead of Correlations"; Unconventional Resources Technology Conference; URTeC:2666; Jul. 20, 2020 (13 pages).

Salem Basfar; "Using Artificial Intelligence to Predict IPR for Vertical Oil Well in Solution Gas Derive Reservoirs: A New Approach" Society of Petroleum Engineers; SPE-192203-MS; Apr. 23, 2018 (12 pages).

Tita Ristanto; "Machine Learning Applied to Multiphase Production Problems"; Thesis for: Master's Degree; Jun. 2018 (71 pages).

Zeeshan Tariq; "New Inflow Performance Relationship for a Horizontal Well in a Naturally Fractured Solution Gas Drive Reservoirs using Artificial Intelligence Technique"; Offshore Technology Conference Asia; OTC-28367-MS; Mar. 18, 2020 (16 pages).

Zeeshan Tariq; "Real-time prognosis of flowing bottom-hole pressure in a vertical well for a multiphase flow using computational intelligence techniques"; Journal of Petroleum Exploration and Production Technology; 10.1007/s13202-019-0728-4; Jul. 18, 2019 (18 pages).

Jiang, Su, and Louis J. Durlofsky. "Data-space inversion using a recurrent autoencoder for time-series parameterization." Computational Geosciences 25.1 (2021): 411-432. (Year: 2021).

Bendakhlia, H., & Aziz, K. (Oct. 8, 1989). Inflow Performance Relationships for Solution-Gas Drive Horizontal Wells. Paper presented at the SPE Annual Technical Conference and Exhibition, San Antonio, Texas, USA. SPE-19823-MS. https://doi.org/10.2118/19823-MS (10).

Blasingame, T.A., Perego, A.D., & Rushing, J.A. (Jun. 2008). Estimating Reserves Using the Arps Hyperbolic Rate-Time Relation: Theory, Practice and Pitfalls. Paper CIM 2008-108 presented at the 59th Annual Technical Meeting of the Petroleum Society, Calgary, Alberta, Canada. (19).

Fetkovich, M.J. (Sep. 30-Oct. 3, 1973). The Isochronal Testing of Oil Wells. Paper presented at the Fall Meeting of the Society of Petroleum Engineers of AIME, Las Vegas, Nevada, USA. SPE-4529-MS. https://doi.org/10.2118/4529-MS (24).

Jones, R.S. (Aug. 2016). Producing Gas-Oil Ratio Behavior of Tight Oil Reservoirs. Paper presented at the SPE/AAPG/SEG Unconventional Resources Technology Conference, San Antonio, Texas, USA. URTEC-2460396-MS. https://doi.org/10.15530/URTEC-2016-2460396 (20).

Khorsandi, S., Tang, Y., Li, Y., Chen, Y., Shrestha, A., Wang, K., Sun, J., & Duan, S. (Jun. 2025). Drawdown Optimization in Unconventional Wells Using Coupled Reservoir and Surface Modeling. Paper presented at theSPE/AAPG/SEG Unconventional Resources Technology Conference, Houston, Texas, USA. URTEC-4250662-MS.https://doi.org/10.15530/urtec-2025-4250662 (21).

Mayerhofer, M.J., Lolon, E., Warpinski, N.R., Cipolla, C.L., Walser, D.W., & Rightmire, C.M. (2010). What Is Stimulated Reservoir Volume? SPE Production & Operations, 25(01), 89-98. SPE-119890-PA. https://doi.org/10.2118/119890-PA (10).

Nguyen, H., Nguyen, T., & Hoang, K. (Apr. 2025). Inflow Performance Relationship (IPR) Over Time Development for Fractured Horizontal Wells in the Wolfcamp A Formation, Delaware Basin. Paper presented at the SPE Oklahoma City Oil and Gas Symposium/Production and Operations Symposium, Oklahoma City, Oklahoma, USA. SPE-224380-MS. https://doi.org/10.2118/224380-MS (16).

Ozkan, E., Brown, M.L., Raghavan, R., & Kazemi, H. (Mar. 2009). Comparison of Fractured Horizontal-Well Performance in Conventional and Unconventional Reservoirs. Paper presented at the SPE Western Regional Meeting, San Jose, California, USA. SPE-121290-MS. https://doi.org/10.2118/121290-MS (16).

Petroleum Experts Ltd. (2025). Integrated Production Modeling (IPM) Suite—GAP, PROSPER, MBAL, and PVTP. Retrieved from https://www.petex.com/products/ipm-suite/.

Retnanto, A., & Economides, M.J. (Aug. 20-22, 1998). Inflow Performance Relationships of Horizontal and Multibranched Wells in a Solution-Gas-Drive Reservoir. Paper presented at the European Petroleum Conference, The Hague, Netherlands. SPE-50659-MS. https://doi.org/10.2118/50659-MS (9).

Rueda, J. I., Zakharov, A., & Mach, J. (Apr. 17-19, 2005). Investigating Applicability of Vogel's IPR for Fractured Wells. Paper presented at the SPE Production Operations Symposium, Oklahoma City, Oklahoma, USA. SPE-94252-MS. https://doi.org/10.2118/94252-MS (9).

Shahamat, M. S., Tabatabaie, S. H., Mattar, L., & Motamed, E. (Oct. 20, 2015). Inflow Performance Relationship for Unconventional Reservoirs (Transient IPR). SPE/CSUR Unconventional Resources Conference, Calgary, Alberta, Canada. SPE-175975-MS. https://doi.org/10.2118/175975-MS (19).

Standing, M.B. (Nov. 1970). Inflow Performance Relationships for Damaged Wells Producing by Solution-Gas Drive. Journal of Petroleum Technology, 22(11), 1399-1400. SPE-3237-PA. https://doi.org/10.2118/3237-PA.

Standing, M.B. (Sep. 1971). Concerning the Calculation of Inflow Performance of Wells Producing from Solution Gas Drive Reservoirs. Journal of Petroleum Tech., 23(9), 1141-1142. SPE-3332-PA. https://doi.org/10.2118/3332-PA.

(56) References Cited

OTHER PUBLICATIONS

Sun, J., Ma, X., & Kazi, M. (Apr. 22, 2018). Comparison of Decline Curve Analysis (DCA) with Recursive Neural Networks (RNN) for Production Forecast of Multiple Wells. Paper presented at the SPE Western Regional Meeting, Garden Grove, California, USA. SPE-190104-MS. https://doi.org/10.2118/190104-MS (11).

Vogel, J.V. (1968). Inflow Performance Relationships for Solution-Gas Drive Wells. Journal of Petroleum Technology,20 (01), 83-92. SPE-1476-PA. https://doi.org/10.2118/1476-PA.

Wattenbarger, R.A., El-Banbi, A.H., Villegas, M.E., & Maggard, J.B. (Apr. 5-8, 1998). Production Analysis of Linear Flow Into Fractured Tight Gas Wells. Paper presented at the SPE Rocky Mountain Regional/Low-Permeability Reservoirs Symposium and Exhibition, Denver, Colorado, USA. SPE-39931-MS. https://doi.org/10.2118/39931-MS (12).

Yuan, B., Su, Y., Moghanloo, R. G., Rui, Z., Wang, W., & Shang, Y. (2015). A new analytical multi-linear solution for gas flow toward fractured horizontal wells with different fracture intensity. Journal of Natural Gas Science and Engineering, 23, 227-238. https://doi.org/10.1016/j.jngse.2015.01.040.

Yula Tang, et al., (Oct. 20-22, 2025) "Unconventional Inflow Performance Relationship and Machine Learning Study"; Paper presented at the SPE Annual Technical Conference and Exhibition held in Houston, Texas USA. SPE-228040-MS. (25).

Zhou, W., Banerjee, R., & Proano, E. (2016). Nodal Analysis for Unconventional Reservoirs—Principles and Application. SPE Journal, 21(01), 245-255. SPE-171768-PA. https://doi.org/10.2118/171768-PA.

Zhou, W., Samson, B., Krishnamurthy, S., Tilke, P., Banerjee, R., Spath, J., & Thambynayagam, M. (Jun. 2013). Analytical Reservoir Simulation and Its Applications to Conventional and Unconventional Resources. Paper presented at the EAGE Annual Conference & Exhibition incorporating SPE Europec, London, UK. SPE-164882-MS. https://doi.org/10.2118/164882-MS (12).

Fetkovich, Michael J. "Decline curve analysis using type curves." SPE, Jun. 1980. (Year: 1980), 13 pages.

Lemouzy, P. M., et al. "Successful history matching of Chaunoy field reservoir behavior using geostatistical modeling." SPE Annual Technical Conference and Exhibition ?. SPE, 1995. (Year: 1995), 16 pages.

Submit Your Proposals for ATCE 2026—Call for Papers. https://www.atce.org/. (Year: 2026), 15 pages.

* cited by examiner

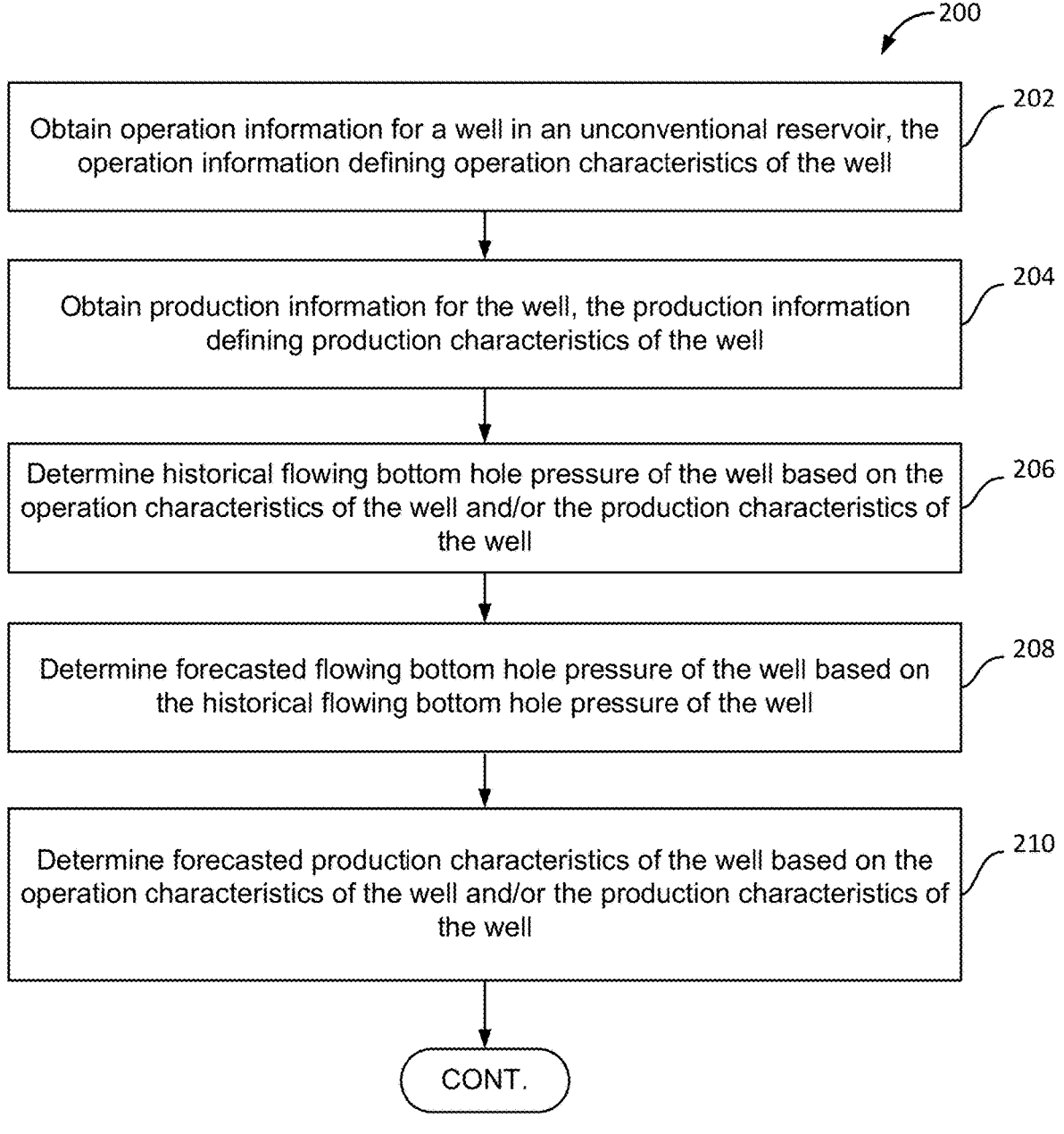

200

202
Obtain operation information for a well in an unconventional reservoir, the operation information defining operation characteristics of the well 204
Obtain production information for the well, the production information defining production characteristics of the well 206
Determine historical flowing bottom hole pressure of the well based on the operation characteristics of the well and/or the production characteristics of the well 208
Determine forecasted flowing bottom hole pressure of the well based on the historical flowing bottom hole pressure of the well 210
Determine forecasted production characteristics of the well based on the operation characteristics of the well and/or the production characteristics of the well

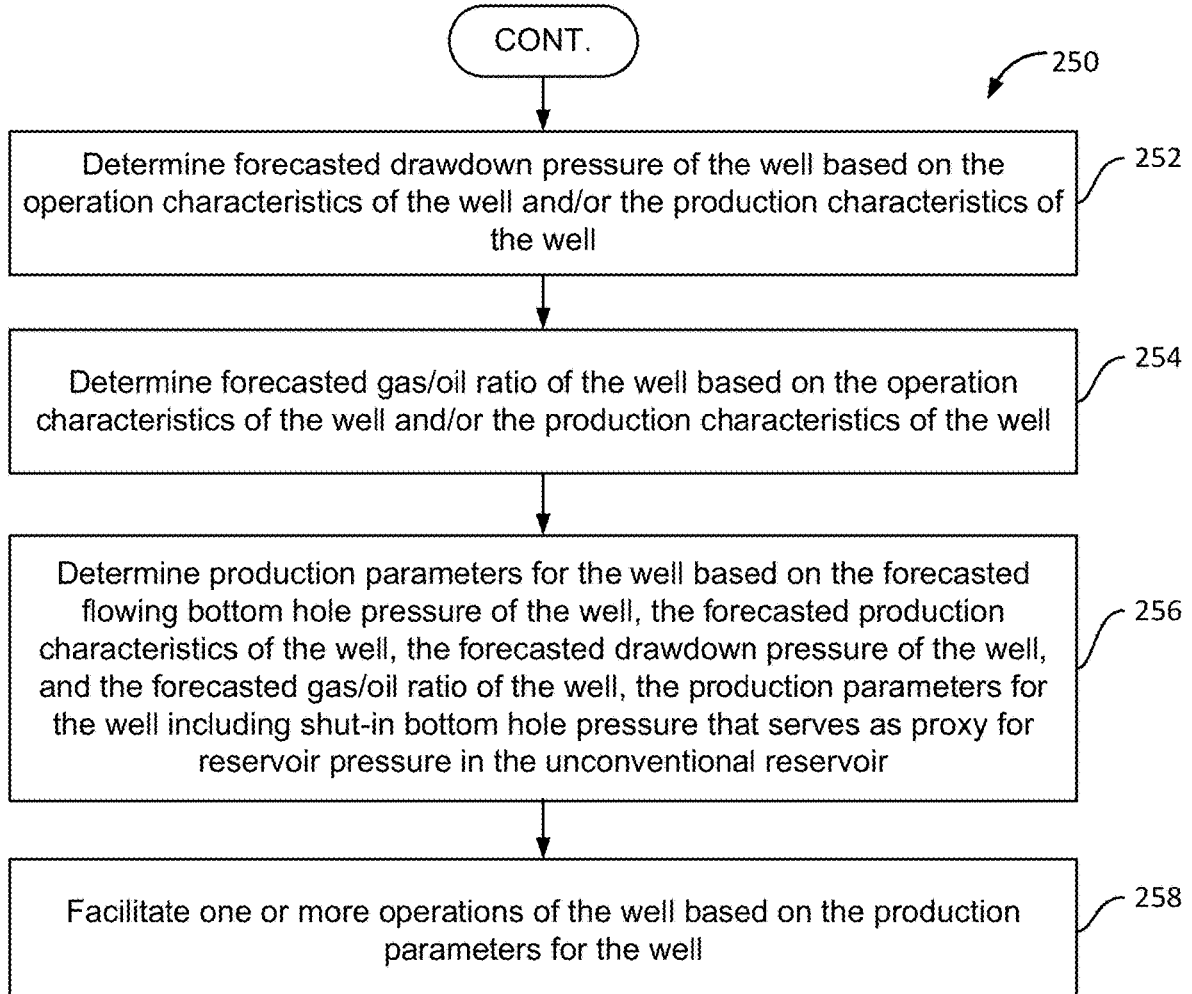

CONT.

250

Determine forecasted drawdown pressure of the well based on the operation characteristics of the well and/or the production characteristics of the well — 252

Determine forecasted gas/oil ratio of the well based on the operation characteristics of the well and/or the production characteristics of the well — 254

Determine production parameters for the well based on the forecasted flowing bottom hole pressure of the well, the forecasted production characteristics of the well, the forecasted drawdown pressure of the well, and the forecasted gas/oil ratio of the well, the production parameters for the well including shut-in bottom hole pressure that serves as proxy for reservoir pressure in the unconventional reservoir — 256

Facilitate one or more operations of the well based on the production parameters for the well — 258

Input Data 410

Operation Characteristics 412

Production Characteristics 414

Historical FBHP Determination Using ML Model(s) 422

Forecasted FBHP Determination 424

Forecasted Production Characteristic Determination 426

Drawdown Pressure Determination Using ML Model(s) 428

Gas/Oil Ratio Determination Using ML Model(s) 430

500

Calculation 510

$Q_G = GOR \times Q_O$
512

Water Cut $= Q_W / (Q_O + Q_W)$
514

$SBHP = FBHP + DP$
516

$PI = (Q_O + Q_W) / DP$
518

Production Parameters 520

GOR, Water Cut, FBHP, SBHP, PI

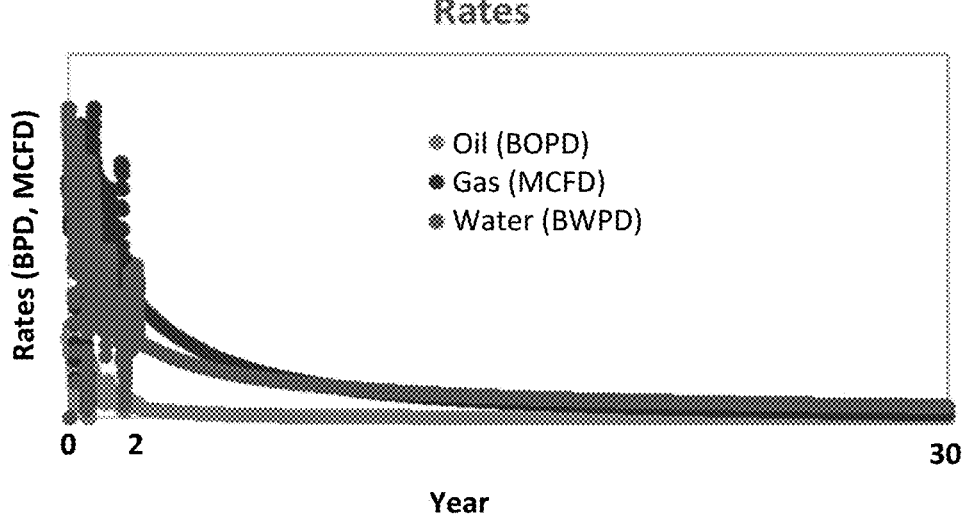
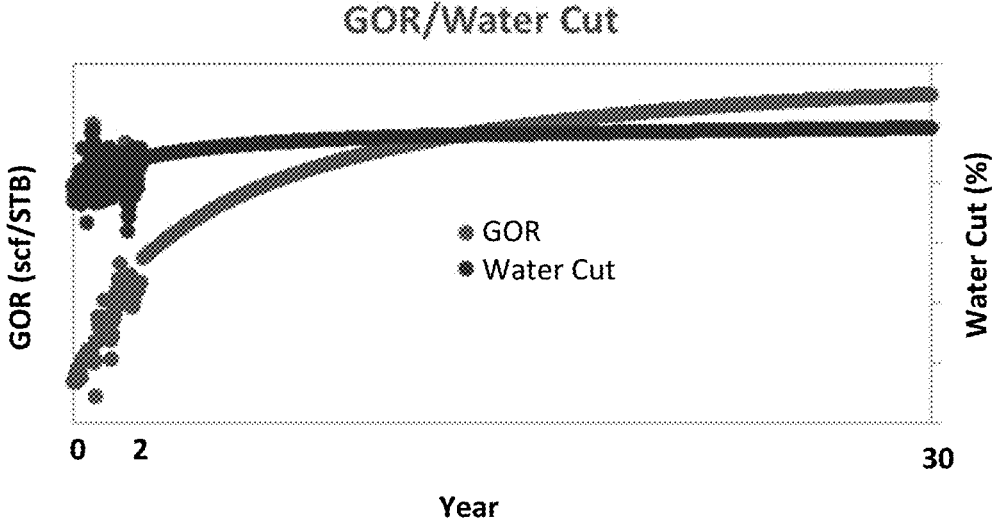
FIG. 7A

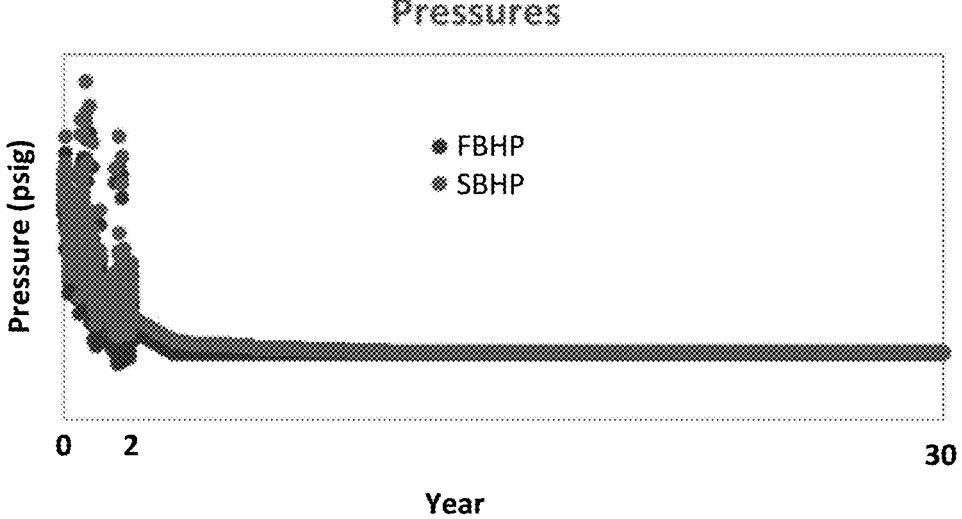
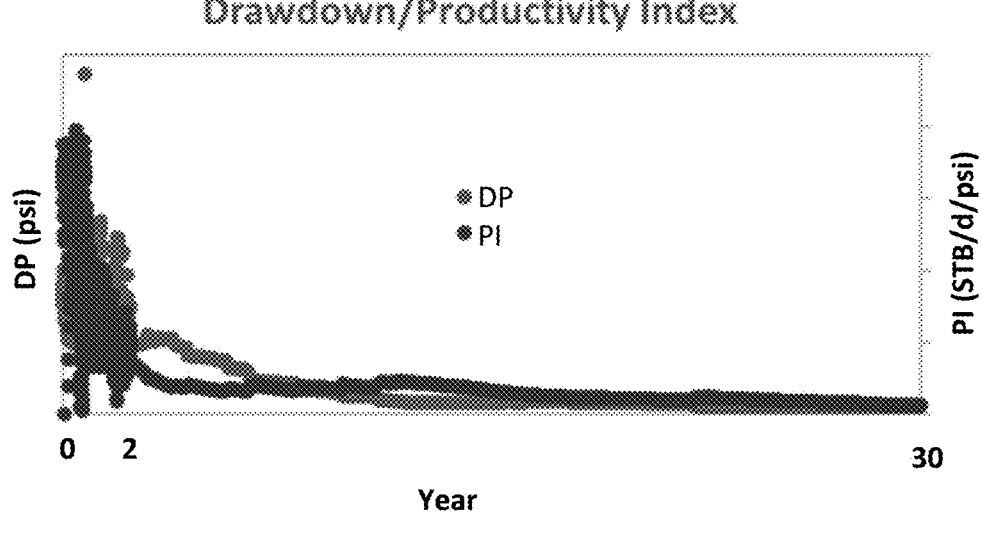
FIG. 7B

SYSTEMS AND METHODS FOR FACILITATING OPERATIONS OF A WELL IN AN UNCONVENTIONAL RESERVOIR

FIELD

The present disclosure relates generally to the field of controlling well operations in unconventional reservoirs using a hybrid modeling approach.

BACKGROUND

Some unconventional wells (wells in unconventional reservoirs) may experience fast production rate decline and may experience quick reservoir depletion with ensuing rapid pressure drop. Understanding dynamic behavior of unconventional wells is critical for efficient operation of unconventional wells.

SUMMARY

This disclosure relates to controlling well operations in unconventional reservoirs. Operation information for a well in an unconventional reservoir, production information for the well, and/or other information may be obtained. The operation information may define operation characteristics of the well. The production information may define production characteristics of the well. Historical flowing bottom hole pressure of the well may be determined based on the operation characteristics of the well, the production characteristics of the well, and/or other information. Forecasted flowing bottom hole pressure of the well may be determined based on the historical flowing bottom hole pressure of the well and/or other information. Forecasted production characteristics of the well may be determined based on the operation characteristics of the well, the production characteristics of the well, and/or other information.

Forecasted drawdown pressure of the well may be determined based on the operation characteristics of the well, the production characteristics of the well, and/or other information. Forecasted gas/oil ratio of the well may be determined based on the operation characteristics of the well, the production characteristics of the well, and/or other information. Production parameters for the well may be determined based on the forecasted flowing bottom hole pressure of the well, the forecasted production characteristics of the well, the forecasted drawdown pressure of the well, the forecasted gas/oil ratio of the well, and/or other information. The production parameters for the well may include shut-in bottom hole pressure that serves as proxy for reservoir pressure in the unconventional reservoir. One or more operations of the well may be facilitated based on the production parameters for the well and/or other information.

A system for controlling well operations in unconventional reservoirs may include one or more electronic storage, one or more processors and/or other components. The electronic storage may store information relating to an unconventional reservoir, information relating to a well, information relating to a field, operation information, information relating to operation characteristics of a well, production information, information relating to production characteristics of a well, information relating to historical flowing bottom hole pressure of a well, information relating to forecasted flowing bottom hole pressure of a well, information relating to forecasted production characteristics of a well, information relating to forecasted gas/oil ratio of a well, information relating to forecasted gas/oil ratio of a well, information relating to production parameters for a well, information relating to operations of a well, and/or other information.

The processor(s) may be configured by machine-readable instructions. Executing the machine-readable instructions may cause the processor(s) to facilitate controlling well operations in unconventional reservoirs. The machine-readable instructions may include one or more computer program components. The computer program components may include one or more of an operation information component, a production information component, a historical flowing bottom hole pressure component, a forecasted flowing bottom hole pressure component, a forecasted production characteristics component, a forecasted drawdown pressure component, a forecasted gas/oil ratio component, a production parameters component, an operation component, and/or other computer program components.

The operation information component may be configured to obtain operation information for a well in an unconventional reservoir and/or other information. The operation information may define operation characteristics of the well.

The production information component may be configured to obtain production information for the well and/or other information. The production information may define production characteristics of the well.

The historical flowing bottom hole pressure component may be configured to determine historical flowing bottom hole pressure of the well. The historical flowing bottom hole pressure of the well may be determined based on the operation characteristics of the well, the production characteristics of the well, and/or other information. In some implementations, the historical flowing bottom hole pressure of the well may be determined based on the operation characteristics of the well and/or the production characteristics of the well by inputting the operation characteristics of the well and/or the production characteristics of the well into one or more machine learning model. The machine learning model(s) may be configured to output the historical flowing bottom hole pressure of the well. In some implementations, the machine learning model(s) may be trained based on fluid flow simulation of the well and/or other information.

The forecasted flowing bottom hole pressure component may be configured to determine forecasted flowing bottom hole pressure of the well. The forecasted flowing bottom hole pressure of the well may be determined based on the historical flowing bottom hole pressure of the well and/or other information. In some implementations, the forecasted flowing bottom hole pressure of the well may be determined based on the historical flowing bottom hole pressure of the well using an exponential decline analysis and/or other analyses.

The forecasted production characteristics component may be configured to determine forecasted production characteristics of the well. The forecasted production characteristics of the well may be determined based on the operation characteristics of the well, the production characteristics of the well, and/or other information. In some implementations, the forecasted production characteristics of the well may be determined based on the production characteristics of the well using a decline curve analysis and/or other analyses.

The forecasted drawdown pressure component may be configured to determine forecasted drawdown pressure of the well. The forecasted drawdown pressure of the well may be determined based on the operation characteristics of the well, the production characteristics of the well, and/or other information. In some implementations, the forecasted drawdown pressure of the well may be determined based on the operation characteristics of the well and/or the production characteristics of the well by inputting the operation characteristics of the well and/or the production characteristics of the well into one or more machine learning models. The machine learning model(s) may be configured to output the forecasted drawdown pressure of the well. In some implementations, the machine learning model may be trained based on shut-in simulation of the well and/or other information. In some implementations, the shut-in simulation of the well may simulate shut-in of the well for a single day and/or other time durations.

The forecasted gas/oil ratio component may be configured to determine forecasted gas/oil ratio of the well. The forecasted gas/oil ratio of the well may be determined based on the operation characteristics of the well, the production characteristics of the well, and/or other information.

The production parameters component may be configured to determine production parameters for the well. The production parameters for the well may be determined based on the forecasted flowing bottom hole pressure of the well, the forecasted production characteristics of the well, the forecasted drawdown pressure of the well, the forecasted gas/oil ratio of the well, and/or other information. The production parameters for the well may include shut-in bottom hole pressure that serves as proxy for reservoir pressure in the unconventional reservoir. In some implementations, the production parameters for the well may further include water cut and productivity index.

The operation component may be configured to facilitate one or more operations of the well. The operation(s) of the well may be facilitated based on the production parameters for the well and/or other information. In some implementations, facilitation of the operation(s) of the well based on the production parameters for the well may include determination of artificial lift parameters for the well based on production parameters for the well and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2A and FIG. 2B illustrate an example method for controlling well operations in unconventional reservoirs.

FIG. 7A illustrates example determination of rates and GOR/water cut.

FIG. 7B illustrates example determination of pressures and productivity index.

DETAILED DESCRIPTION

The present disclosure relates to controlling well operations in unconventional reservoirs. A hybrid modeling approach incorporates both physics-based reservoir modeling and machine learning technique to capture dynamic behavior of unconventional wells. Shut-in bottom hole pressure for unconventional wells are simulated for use as proxy for reservoir pressure in unconventional reservoirs. Production parameters for unconventional wells (e.g., gas/oil ratio, water cut, flowing bottom hole pressure, shut-in bottom hole pressure, productivity index) are determined for use in controlling the operations of unconventional wells.

Figure 1:
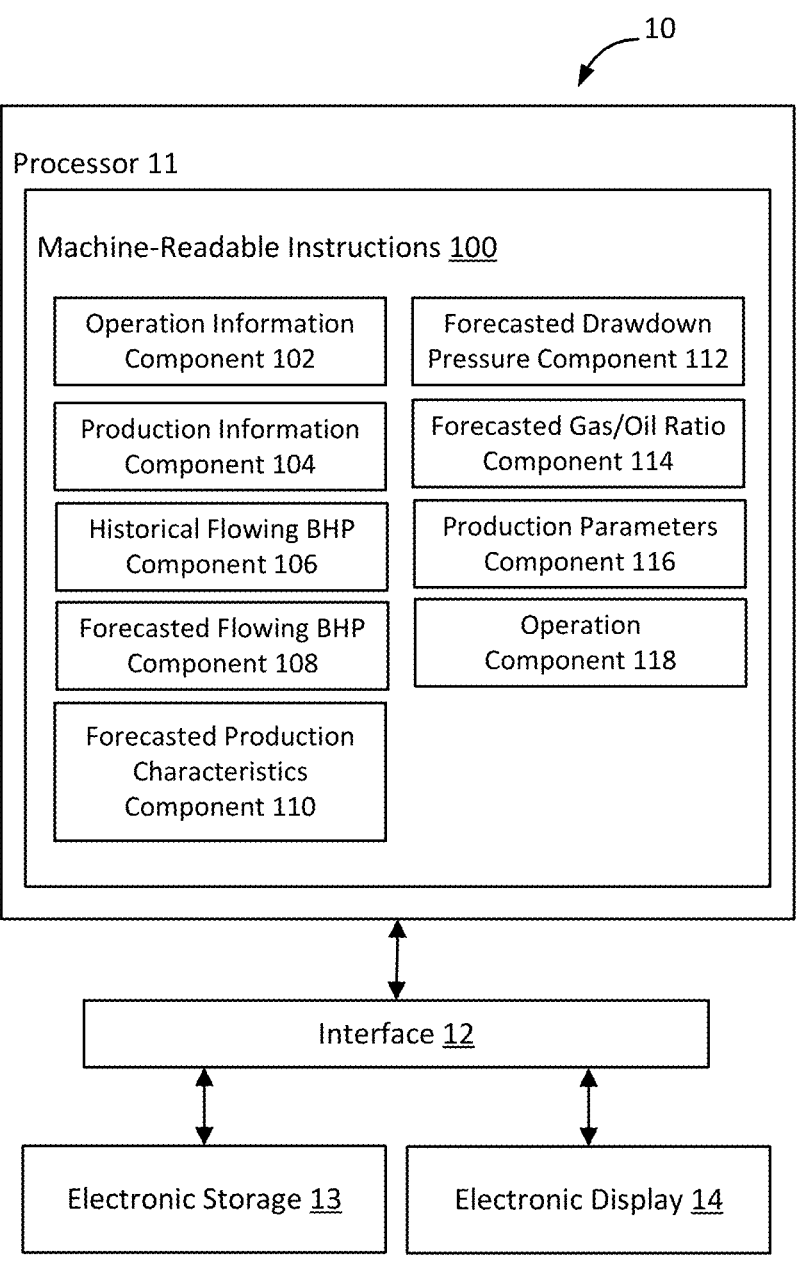
FIG. 1 illustrates an example system for controlling well operations in unconventional reservoirs.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, an electronic display 14, and/or other components. Operation information for a well in an unconventional reservoir, production information for the well, and/or other information may be obtained by the processor 11. The operation information may define operation characteristics of the well. The production information may define production characteristics of the well. Historical flowing bottom hole pressure of the well may be determined by the processor 11 based on the operation characteristics of the well, the production characteristics of the well, and/or other information. Forecasted flowing bottom hole pressure of the well may be determined by the processor 11 based on the historical flowing bottom hole pressure of the well and/or other information. Forecasted production characteristics of the well may be determined by the processor 11 based on the operation characteristics of the well, the production characteristics of the well, and/or other information.

Forecasted drawdown pressure of the well may be determined by the processor 11 based on the operation characteristics of the well, the production characteristics of the well, and/or other information. Forecasted gas/oil ratio of the well may be determined by the processor 11 based on the operation characteristics of the well, the production characteristics of the well, and/or other information. Production parameters for the well may be determined by the processor 11 based on the forecasted flowing bottom hole pressure of the well, the forecasted production characteristics of the well, the forecasted drawdown pressure of the well, the forecasted gas/oil ratio of the well, and/or other information. The production parameters for the well may include shut-in bottom hole pressure that serves as proxy for reservoir pressure in the unconventional reservoir. One or more operations of the well may be facilitated by the processor 11 based on the production parameters for the well and/or other information.

The electronic storage 13 may be configured to include one or more electronic storage media that electronically stores information. The electronic storage 13 may store software algorithms, information determined by the processor 11, information received remotely, and/or other information that enables the system 10 to function properly. For example, the electronic storage 13 may store information relating to an unconventional reservoir, information relating to a well, information relating to a field, operation information, information relating to operation characteristics of a well, production information, information relating to production characteristics of a well, information relating to historical flowing bottom hole pressure of a well, information relating to forecasted flowing bottom hole pressure of a well, information relating to forecasted production characteristics of a well, information relating to forecasted gas/oil ratio of a well, information relating to production parameters for a well, information relating to operations of a well, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present information relating to an unconventional reservoir, information relating to a well, information relating to a field, operation information, information relating to operation characteristics of a well, production information, information relating to production characteristics of a well, information relating to historical flowing bottom hole pressure of a well, information relating to forecasted flowing bottom hole pressure of a well, information relating to forecasted production characteristics of a well, information relating to forecasted gas/oil ratio of a well, information relating to production parameters for a well, information relating to operations of a well, and/or other information.

Dynamic behavior of unconventional reservoir makes operations of wells in the unconventional reservoir (unconventional wells) difficult. For example, inflow performance relationship (IPR) is a reservoir performance indicator that correlates flowing bottomhole pressure with production rate of a well. Inflow performance relationship may include a curve of production rate plotted against flowing bottomhole pressure for different types of wells (e.g., oil wells, water wells, gas wells). The shape of the curve may be influenced by the reservoir fluid composition, reservoir properties, wellbore conditions, near wellbore formation conditions, and/or other factors. The combination of an outflow performance curve and an inflow performance curve for a well may be used in nodal analysis to determine performance of the well (e.g., in producing fluid) and/or to operate the well (e.g., in increasing production, minimizing formation damage such as plugging of pore throats from fines migration or proppant embedment).

Inflow performance relationship of unconventional wells may be a critical factor/information for modeling behavior of unconventional wells and/or unconventional reservoir. Inflow performance relationship of unconventional wells may be a critical factor/information for improving reservoir management and/or artificial lift through production optimization. Inflow performance relationship may reflect the reservoir behavior during production and may be critical for production optimization and drawdown management. Some unconventional wells/reservoirs may experience fast production rate decline and may experience quick reservoir depletion with the ensuing rapid pressure drop. Unlike the conventional wells/reservoirs, unconventional wells/reservoirs decline behavior is not clearly understood from the first-principle perspective. It is quite challenging in terms of time and effort to capture each well's IPR with conventional reservoir simulation method/process, especially as the number of wells increases.

One of the biggest uncertainties in understanding behavior of unconventional wells/reservoirs is the shut-in bottom hole pressure (SBHP) that corresponds to the wellbore pressure at zero flow rate. Existing solutions may utilize an arbitrary combination of an estimated SBHP and productivity index (PI) with certain constraints (e.g., prior shut-in pressure values) to match the well test through nodal analysis. By nature, this approach accepts the uncertainty with certain assumptions. But such approximation of unconventional well/reservoir behavior results in sub-optimal operational recommendations (e.g., inaccurate/inefficient gas-lift allocation/suboptimal artificial lift design).

The present disclosure provides a tool to accurately model dynamic behavior of unconventional wells/reservoirs and determine production parameters to improve (e.g., increase efficiency of, optimize) well operations. A hybrid modeling that incorporates both physics-based modeling and machine-learning techniques is used to capture the dynamic behavior of unconventional wells/reservoirs. The tool enables behavior of unconventional wells/reservoirs, such as inflow performance relationship, flowing bottom hole pressure, productivity index, drawdown pressure, gas/oil ratio, and/or water cut, to be accurately determined (e.g., estimated, calculated, predicted, forecasted).

Figure 3:
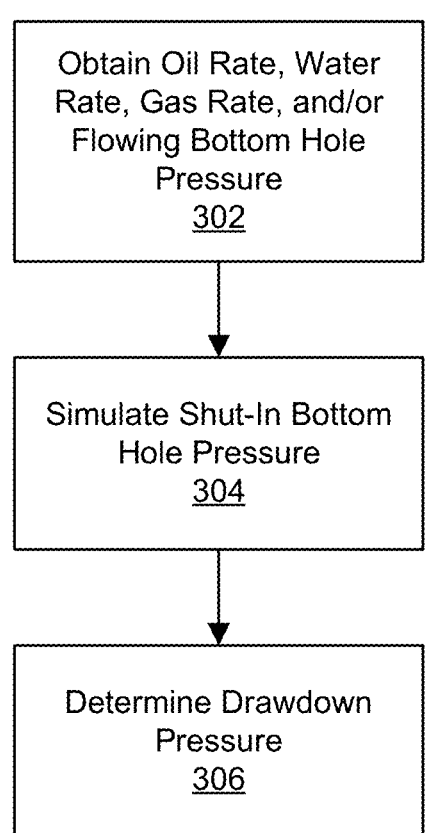
FIG. 3 illustrates an example flow diagram for controlling well operations in unconventional reservoirs.

FIG. 3 illustrates an example flow diagram 300 for controlling well operations in unconventional reservoirs. At step 302, oil rate, water rate, gas rate, and flowing bottom hole pressure (FBHP) of one or more wells in an unconventional reservoir may be obtained. Oil rate, water rate, gas rate, and/or flowing bottom hole pressure may be obtained for different times. That is, time-series data of oil rate, water rate, gas rate, and/or flowing bottom hole pressure may be obtained. In some implementations, the flowing bottom hole pressure may be indirectly obtained. For example, downhole pressure and/or wellhead pressure of well(s) at different times may be obtained, and downhole pressure and/or wellhead pressure of the well(s) may be converted into flowing bottom hole pressure using a physics-based modeling tool (e.g., steady state simulator, fluid flow simulation). As another example, the flowing bottom hole pressure of the well(s) at different times may be determined by inputting downhole pressure and/or wellhead pressure into a machine learning model trained to output flowing bottom hole pressure. Other information relating to well(s) (e.g., operation characteristics, production characteristics) may be obtained.

Historical data and forecasted data of well(s) may be obtained. For example, historical oil rate, water rate, gas rate, and/or flowing bottom hole pressure of a well may be obtained. Historical oil rate, water rate, gas rate, and/or flowing bottom hole pressure of a well may be used to forecast oil rate, water rate, gas rate, and/or flowing bottom hole pressure of the well in the future.

In some implementations, multiple wells may be selected from an unconventional reservoir. Oil rate, water rate, gas rate, and flowing bottom hole pressure of the selected wells may be obtained. The multiple wells may be selected to be representative of the unconventional reservoir. For example, P10, P50, P90 wells from different areas of the unconventional reservoir may be selected to be representative of the unconventional reservoir. The wells may be selected based on well performance (e.g., production), target benches, subsurface production zones, geographical locations, and/or other factors.

At step 304, shut-in bottom hole pressure of well(s) may be simulated. Reservoir pressure in an unconventional reservoir may be difficult to obtain because of the low permeability the unconventional reservoir. Shut-in bottom hole pressure may be simulated for use as proxy for reservoir pressure in the unconventional reservoir. Shut-in bottom hole pressure may be simulated using a physics-based reservoir simulator. Shut-in bottom hole pressure may refer to the pressure at the bottom of the well (wellbore) when the well is closed (e.g., when the surface valves of the well are closed). The well(s) and/or the unconventional reservoir may be modeled using information relating to well(s) (e.g., operation characteristics, production characteristics). Shut-in bottom hole pressure may be simulated (e.g., in fluid flow simulation) by setting the flow rate of a well to zero.

Shut-in bottom hole pressure may be simulated for different durations of time. For example, a single-day, multiple days, a single-week, multiple weeks, a single-month, multiple months of a well shut-in may be simulated. Shut-in of wells may be simulated at different times. For example, shut-in of wells may be simulated at different periodic intervals. For instance, shut-in of wells may be simulated daily, weekly, monthly, quarterly, and/or at other periodic intervals.

Shut-in bottom hole pressure may be simulated using historical data and forecasted data. For example, historical shut-in bottom hole pressure of a well at different times in the past may be simulated using historical data for the well. Forecasted shut-in bottom hole pressure of the well at different times in the future may be simulated using forecasted data for the well.

At step 306, drawdown pressure of well(s) may be determined. Drawdown pressure may refer to the difference between the reservoir pressure and the flowing bottom hole pressure. Drawdown pressure may refer to the pressure that drives fluids from a reservoir into a well. Shut-in bottom hole pressure may be used as proxy for reservoir pressure, and the drawdown pressure (DP) may be calculated as the difference between the shut-in bottom hole pressure (SBHP) and the flowing bottom hole pressure (FBHP). Drawdown pressure may be determined for different times in the past using historical data and for different times in the future using forecasted data:

$$DP = SBHP - FBHP$$

Use of physics-based simulations to model reservoir behavior may be difficult and resource intensive/computationally expensive. It may be impractical to perform simulations of wells/reservoir to obtain flowing bottom hole pressure, shut-in bottom hole pressure, and/or drawdown pressure of wells. Information obtained from flow diagram 300 may be used to train machine-learning models to facilitate control of well operations. For example, machine-learning models may be trained to output flowing bottom hole pressure, drawdown pressure, and/or other characteristics of unconventional wells/reservoir. The machine-learning models may be used to increase the speed of unconventional wells/reservoir behavior analysis while decreasing the cost of unconventional wells/reservoir behavior analysis. The machine learning models may include one or multiple types of model or utilize one or multiple types of algorithms. Example types of machine-learning models or algorithms that may be used include random forest, XGBoost, AdaBoost, lasso, long short-term memory, and ridge. Use of other types of machine-learning model is contemplated.

Figure 4:
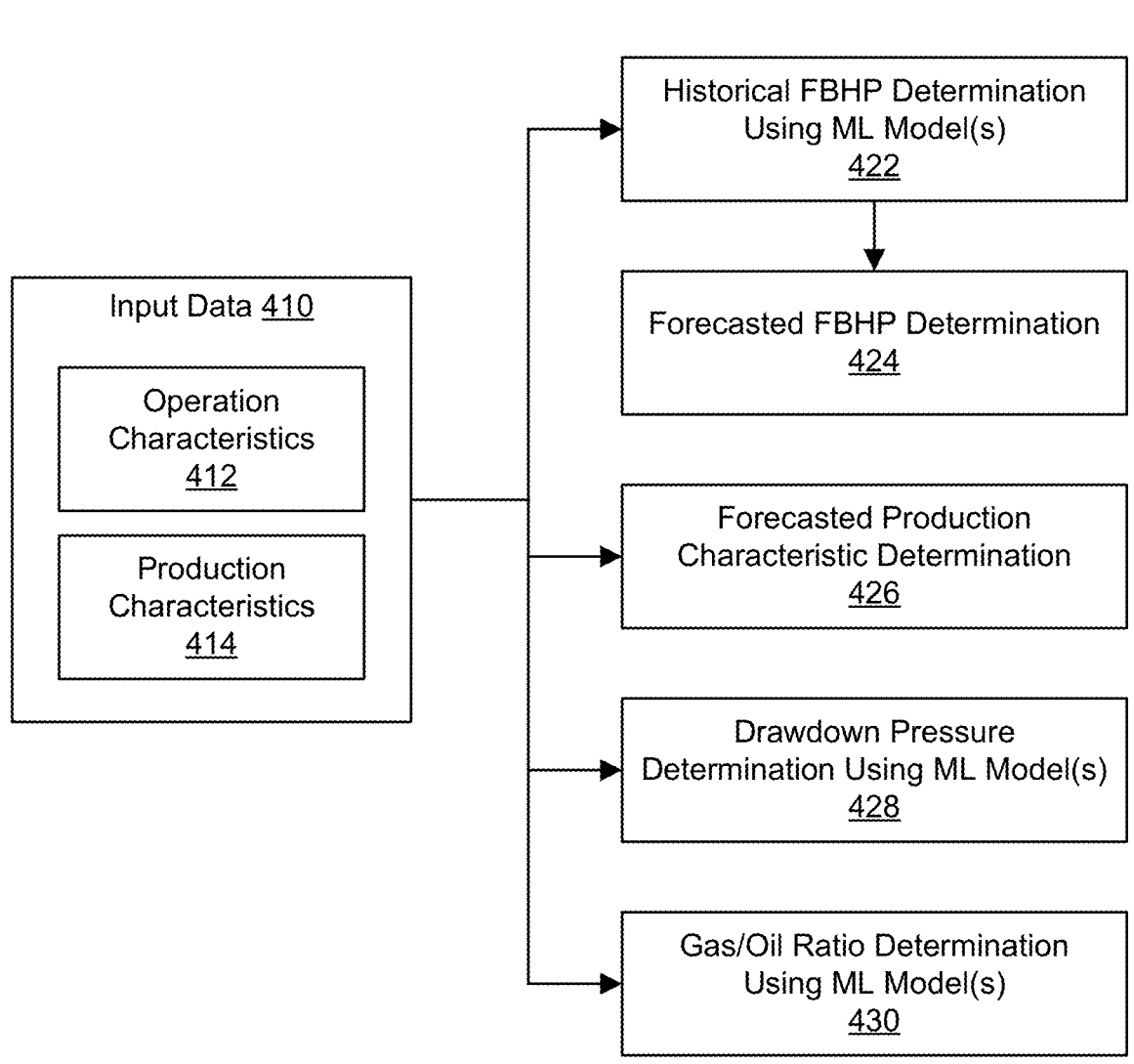
FIG. 4 illustrates an example flow diagram for controlling well operations in unconventional reservoirs.

FIG. 4 illustrates an example flow diagram 400 for controlling well operations in unconventional reservoirs. Input data 410 for one or more wells in an unconventional reservoir may be obtained. The input data 410 may include operation characteristics 412 and/or production characteristics 414 of the well(s). Input data 410 may include historical data of the well(s) and/or forecasted data of the well(s). The input data 410 may include other characteristics of the well(s).

Operation characteristics of a well may refer to attribute, quality, configuration, parameter, and/or characteristics of matter inside, within, and/or around the well during operation. Operation characteristics of a well may refer to characteristics of the well, characteristics of one or more components of the well, characteristics of conditions around the well, characteristics of conditions inside the well, and/or other characteristics of the during operation. Operation characteristic of a well may include static characteristics (e.g., design of the well) and/or dynamic characteristics (e.g., properties of materials/fluids inside or around the well, operation parameters of the well). Operation characteristic of a well may be measured using one or more sensors. For example, operation characteristics of a well may include flowing bottom hole pressure, wellhead pressure, downhole pressure, casing head pressure/gas injection pressure, flow-rate, temperature, well depth, true vertical depth, well location, and/or reservoir thickness. Other types of operation characteristics are contemplated.

Production characteristics of a well may refer to attribute, quality, configuration, parameter, and/or characteristics of matter produced, extracted, and/or recovered from/through the well during operation. Production characteristics of a well may refer to characteristics of matter inside and/or around the well during operation. Production characteristics of a well may include static characteristics and/or dynamic characteristics. Production characteristic of a well may be measured using one or more sensors. For example, production characteristics of a well may include oil rate (oil production rate), water rate (water production rate), gas rate (gas production rate), gas/oil ratio, cumulative production (e.g., cumulative oil production, cumulative water production, cumulative gas production). Other types of production characteristics are contemplated.

In some implementations, one or more pre-processing techniques may be utilized on the input data 410. For example, the input data 410 may be preprocessed as part of data quality check, to remove outlier data, and/or to otherwise prepare the input data 410 for use. For example, the input data 410 may be preprocessed to remove outliers, anomalies, unreasonable values (e.g., according to subject matter experts), zero values, not applicable values, text entries, and/or other values. Curve smoothing (e.g., Hanning window smoothing) may be performed to clean the input data 410. Long short-term memory (LSTM) autoencoder may be used to remove outliers and/or anomalies from time series data.

The input data 410 (the operation characteristics 412 and/or the production characteristics 414) may be used to determine one or more characteristics of the well(s) in the unconventional reservoir. For example, at step 422, the input data 410 may be used to determine historical flowing bottom hole pressure of the well(s). The input data 410 may be input into one or more machine learning models trained to output flowing bottom hole pressure. For example, the machine learning model(s) may be trained to receive as input the operation characteristics 412 and/or the production characteristics 414 of a well corresponding to particular moment(s) in time, and output the flowing bottom hole pressure of the well at the particular moment(s) in time. Historical input data may be input into the machine learning model(s) to obtain historical flowing bottom hole pressure of the well. Present input data may be input into the machine learning model(s) to obtain present flowing bottom hole pressure of the well. Forecasted input data may be input into the machine learning model(s) to obtain forecasted flowing bottom hole pressure of the well. At step 422, historical input data may be input into the machine learning model(s) to obtain historical flowing bottom hole pressure of the well(s).

The machine learning model(s) may be trained based on fluid flow simulation of the well(s) and/or other information. For example, a physics-based modeling tool may be used to perform fluid flow simulation of a well, and convert operation characteristics and/or production characteristics of the well into the flowing bottomhole pressure of the well. The inputs (e.g., operation characteristics, production characteristics) and outputs (e.g., flowing bottom hole pressure) of the conversion using the physics-based modeling may be used as input-output pairs for training the machine-learning model(s).

At step 424, forecasted flowing bottom hole pressure of well(s) may be determined. Forecasted flowing bottom hole pressure of a well may refer to flowing bottom hole pressure of the well that is predicted/estimated to occur in the future. Forecasted flowing bottom hole pressure of a well may be determined for multiple moments in the future based on the historical flowing bottom hole pressure of the well and/or other information. For example, forecasted flowing hole pressure of a well may be determined using analytical equation(s) to extrapolate flowing bottom hole pressure in the future based on historical flow bottom hole pressure. For example, time-series of forecasted flowing bottom hole pressure of a well may be determined based on time-series of historical flowing bottom hole pressure of the well using an exponential decline analysis. Use of other forecasting techniques is contemplated.

At step 426, the input data 410 (the operation characteristics 412 and/or the production characteristics 414) may be used to determine forecasted production characteristics of the well(s). Forecasted production characteristics of a well may refer to production characteristics of the well that is predicted/estimated to occur in the future. Forecasted production characteristics of a well may be determined for multiple moments in the future based on the historical operation characteristics of the well, forecasted operation characteristics of the well, historical production characteristics of the well, and/or other information. For example, the forecasted production characteristics may be determined using curve fitting analysis to extrapolate production characteristics in the future based on historical production characteristics. For example, time-series of forecasted production characteristics of a well may be determined based on time-series of historical production characteristics of the well using a decline-curve analysis. For instance, time-series of forecasted oil rate and forecasted water rate of a well may be determined based on time-series of historical oil rate and historical water rate of the well using a decline-curve analysis. Separate analysis may be performed for separate production characteristics of the wells. Use of other forecasting techniques is contemplated.

At step 428, the input data 410 may be used to determine drawdown pressure of the well(s). The input data 410 may be input into one or more machine learning models trained to output drawdown pressure. For example, the machine learning model(s) may be trained to receive as input the operation characteristics 412 and/or the production characteristics 414 of a well corresponding to particular moment(s) in time, and output the drawdown pressure of the well at the particular moment(s) in time. Historical input data may be input into the machine learning model(s) to obtain historical drawdown pressure of the well. Present input data may be input into the machine learning model(s) to obtain present drawdown pressure of the well. Forecasted input data may be input into the machine learning model(s) to obtain forecasted drawdown pressure of the well. At step 428, historical/present/forecasted input data may be input into the machine learning model(s) to obtain historical/present/forecasted drawdown pressure of the well(s).

The machine learning model(s) may be trained based on shut-in simulation of the well(s) and/or other information. For example, a physics-based modeling tool may be used to perform fluid flow simulation of a well, and shut-in of the well may be simulated for a single hour, multiple hours, a single-day (e.g., 24 hours), multiple days, a single-week, multiple weeks, a single-month, multiple months, and/or other durations of times. Simulated shut-in of the well may be repeated at periodic intervals, such as daily, weekly, monthly, quarterly, and/or at other periodic intervals. Shut-in simulation of the well may provide shut-in bottom hole pressure of the well. The drawdown pressure of the well may be determined by calculating the difference between the shut-in bottom hole pressure and the flowing bottom hole pressure. The inputs (e.g., operation characteristics, production characteristics) and outputs (e.g., drawdown pressure) of the physics-based modeling may be used as input-output pairs for training the machine-learning model(s).

At step 430, the input data 410 may be used to determine gas/oil ratio of the well(s). The input data 410 may be input into one or more machine learning models trained to output gas/oil ratio. For example, the machine learning model(s) may be trained to receive as input the operation characteristics 412 and/or the production characteristics 414 of a well corresponding to particular moment(s) in time, and output the gas/oil ratio of the well at the particular moment(s) in time. Historical input data may be input into the machine learning model(s) to obtain historical gas/oil ratio of the well. Present input data may be input into the machine learning model(s) to obtain present gas/oil ratio of the well. Forecasted input data may be input into the machine learning model(s) to obtain forecasted gas/oil ratio of the well. At step 430, historical/present/forecasted input data may be input into the machine learning model(s) to obtain historical/present/forecasted gas/oil ratio of the well(s).

The machine learning model(s) may be trained based on fluid flow simulation of the well(s) and/or other information. For example, a physics-based modeling tool may be used to perform fluid flow simulation of a well, and convert operation characteristics and/or production characteristics of the well into the gas/oil ratio of the well. The inputs (e.g., operation characteristics, production characteristics) and outputs (e.g., gas/oil ratio) of the conversion using the physics-based modeling may be used as input-output pairs for training the machine-learning model(s).

By the end of the flow diagram 400, the following information for the well(s) may be obtained: historical and forecasted flowing bottom hole pressure, historical and forecasted oil rate and water rate, historical and forecasted drawdown pressure, and historical and forecasted gas/oil ratio. Trends of flowing bottom hole pressure, oil rate, water rate, drawdown pressure, and gas/oil ratio may be obtained. Other information for the well(s) may be obtained by the end of the flow diagram 400.

Figure 5:
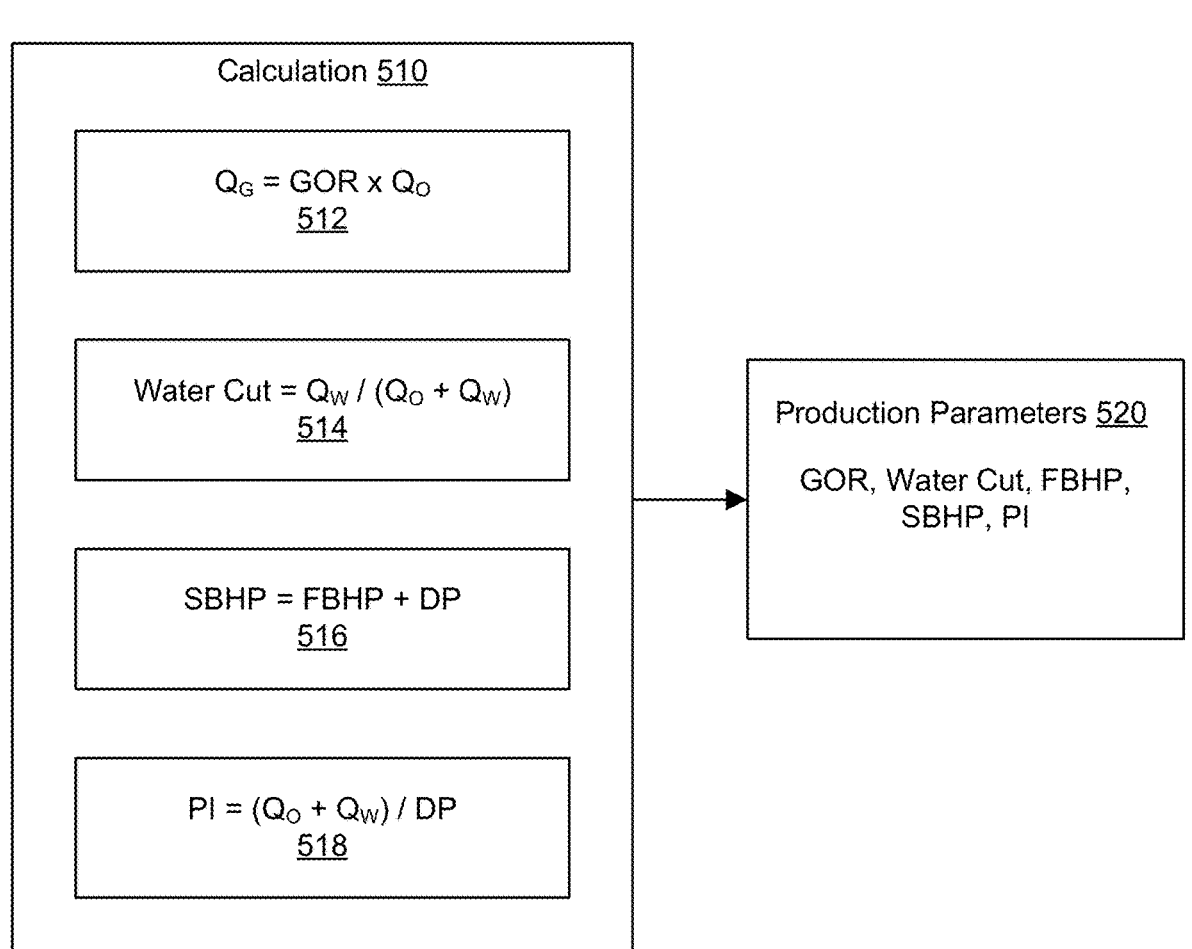
FIG. 5 illustrates an example flow diagram for controlling well operations in unconventional reservoirs.

FIG. 5 illustrates an example flow diagram 500 for controlling well operations in unconventional reservoirs. At step 510, calculation may be performed using input data for one or more wells. The input data for the well(s) may include historical input data, present input data, and/or forecasted input data. The input data for the well(s) may include flowing bottom hole pressure (FBHP), oil rate ($Q_O$), water rate ($Q_W$), drawdown pressure (DP), and gas/oil ratio (GOR), and/or other input data. At step 512, the gas rate ($Q_G$) of the well(s) may be determined based on the gas/oil ratio and the oil rate of the well(s). The gas rate of the well(s) may be determined as the product of the gas/oil ratio and the oil rate of the well(s). At step 514, the water cut of the well(s) may be determined based on the water rate and the oil rate of the well(s). The water cut of the well(s) may be determined as the ratio of the water rate to the sum of the oil rate and the water rate of the well(s). At step 516, shut-in bottom hole pressure (SBHP) of the well(s) may be determined based on the flowing bottom hole pressure and the drawdown pressure of the well(s). The shut-in bottom hole pressure of the well(s) may be determined as the sum of the flowing bottom hole pressure and the drawdown pressure of the well(s). At step 518, the productivity index (PI) of the well(s) may be determined based on the oil rate, the water rate, and the drawdown pressure of the well(s). The productivity index of the well(s) may be determined as the ratio of the sum of the oil rate and the water rate to the drawdown pressure the of the well(s).

The inputs and/or the outputs of the calculation 510 may be used as production parameters 520 for the well(s). For example, the gas/oil ratio, the water cut, the flowing bottom hole pressure, the shut-in bottom hole pressure, and the productivity index may be used as the production parameters 520 for the well(s). The production parameters 520 of the well(s) may be used to facilitate one or more operations at the well(s). For example, the production parameters 520 of the well(s) may be used to start, stop, modify, and/or otherwise control operations of the well(s). The production parameters 520 of the well(s) may be used to determine the inflow performance relationship(s) of the well(s). The operations at the well(s) may be performed using the production parameters 520 to improve (e.g., increase efficiency of, optimize) well operations.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate controlling well operations in unconventional reservoirs. The machine-readable instructions 100 may include one or more computer program components. The machine-readable instructions 100 may include one or more of an operation information component 102, a production information component 104, a historical flowing bottom hole pressure component 106, a forecasted flowing bottom hole pressure component 108, a forecasted production characteristics component 110, a forecasted drawdown pressure component 112, a forecasted gas/oil ratio component 114, a production parameters component 116, an operation component 118, and/or other computer program components.

The operation information component 102 may be configured to obtain operation information for a well in an unconventional reservoir and/or other information. Obtaining operation information may include one or more of accessing, acquiring, analyzing, determining, developing, examining, generating, identifying, loading, locating, opening, preparing, receiving, retrieving, reviewing, selecting, storing, and/or otherwise obtaining the operation information. The operation information component 102 may obtain operation information from one or more locations. For example, the operation information component 102 may obtain operation information from a storage location, such as the electronic storage 13, electronic storage of a device accessible via a network, and/or other locations. The operation information component 102 may obtain operation information from one or more hardware components (e.g., a computing device) and/or one or more software components (e.g., software running on a computing device).

A well may refer to a hole that is drilled in the ground. A well may be drilled in the ground for exploration and/or recovery of resources in the ground, such as water or hydrocarbons. For example, a well may be drilled for production of hydrocarbons (e.g., as a production well). The term "wellbore," "well bore," "borehole," and the like may be utilized interchangeably with the term "well."

A reservoir may refer to a location at which one or more resources are stored. For example, a reservoir may refer to a location at which hydrocarbons are stored. For instance, a reservoir may refer to a location including rocks in which oil and/or natural gas have accumulated. A reservoir may include regions above the surface, at the surface, and/or below the surface. For example, a reservoir may include one or more subsurface regions. A subsurface region may refer to a part of earth located beneath the surface/located underground. A subsurface region may refer to a part of earth that is not exposed at the surface of the ground. A reservoir may include one or more wells. For example, a reservoir may include one or more injection wells (e.g., for injection of fluid), one or more production wells (e.g., for extraction of oil or gas), and/or other wells. A reservoir may refer to a location in which buoyant forces keep hydrocarbons in place below a sealing caprock. A reservoir may refer to a location in which oil or natural gas do not readily flow into a well. A reservoir may refer to a location in which hydraulic fractures may be used to extract the stored resources, such as an unconventional reservoir (e.g., tight-sand, gas and/or oil shales). An unconventional reservoir may refer to a reservoir where hydrocarbons and/or other resources (e.g., oil, gas) are tightly bound to the rock fabric by strong capillary forces. Resources may be held by dense structure with lower permeability.

The term "formation," "subsurface formation," "subterranean formation," "subsurface volume of interest," "subsurface region of interest," and the like may be utilized interchangeably with the term "reservoir." In some implementations, an unconventional reservoir may have a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some implementations, a reservoir may have a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD). An unconventional reservoir may have a permeability ranging from any of the minimum values described above to any of the maximum values described above. For example, in some implementations, an unconventional reservoir may have a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The operation information may define operation characteristics of the well in the unconventional reservoir. Operation characteristics of a well may refer to attribute, quality, configuration, parameter, and/or characteristics of matter inside, within, and/or around the well during operation. Operation characteristics of a well may refer to characteristics of the well, characteristics of one or more components of the well, characteristics of conditions around the well, characteristics of conditions inside the well, and/or other characteristics of the during operation. Operation characteristic of a well may include static characteristics (e.g., design of the well) and/or dynamic characteristics (e.g., properties of materials/fluids inside or around the well, operation parameters of the well). Operation characteristic of a well may be measured using one or more sensors. For example, operation characteristics of a well may include flowing bottom hole pressure, wellhead pressure, downhole pressure, casing head pressure/gas injection pressure, flowrate, temperature, well depth, true vertical depth, well location, and/or reservoir thickness. Other types of operation characteristics are contemplated.

The operation information may define operation characteristics of a well by including information that characterizes, describes, delineates, identifies, is associated with, quantifies, reflects, sets forth, and/or otherwise defines one or more of value, property, quality, quantity, attribute, feature, and/or other aspects of the operation characteristics of the well. The operation information may directly and/or indirectly define operation characteristics of a well. For example, the operation information may define operation characteristics of a well by including information that specifies the type and/or value of the operation characteristics of the well and/or information that may be used to determine the type and/or value of the operation characteristics of the well. Other types of operation information are contemplated.

The operation information may define operation characteristics of a well at different moments. The operation information may define operation characteristics of a well at different moments in the past. The operation information may include time-series data of the operation characteristics of the well.

The production information component 104 may be configured to obtain production information for the well in the unconventional reservoir and/or other information. Obtaining production information may include one or more of accessing, acquiring, analyzing, determining, developing, examining, generating, identifying, loading, locating, opening, preparing, receiving, retrieving, reviewing, selecting, storing, and/or otherwise obtaining the production information. The production information component 104 may obtain production information from one or more locations. For example, the production information component 104 may obtain production information from a storage location, such as the electronic storage 13, electronic storage of a device accessible via a network, and/or other locations. The production information component 104 may obtain production information from one or more hardware components (e.g., a computing device) and/or one or more software components (e.g., software running on a computing device).

The production information may define production characteristics of the well in the unconventional reservoir. Production characteristics of a well may refer to attribute, quality, configuration, parameter, and/or characteristics of matter produced, extracted, and/or recovered from/through the well during operation. Production characteristics of a well may refer to characteristics of matter inside and/or around the well during operation. Production characteristics of a well may include static characteristics and/or dynamic characteristics. Production characteristic of a well may be measured using one or more sensors. For example, production characteristics of a well may include oil rate (oil production rate), water rate (water production rate), gas rate (gas production rate), gas/oil ratio, cumulative production (e.g., cumulative oil production, cumulative water production, cumulative gas production). Other types of production characteristics are contemplated.

The production information may define production characteristics of a well by including information that characterizes, describes, delineates, identifies, is associated with, quantifies, reflects, sets forth, and/or otherwise defines one or more of value, property, quality, quantity, attribute, feature, and/or other aspects of the production characteristics of the well. The production information may directly and/or indirectly define production characteristics of a well. For example, the production information may define production characteristics of a well by including information that specifies the type and/or value of the production characteristics of the well and/or information that may be used to determine the type and/or value of the production characteristics of the well. Other types of production information are contemplated.

The production information may define production characteristics of a well at different moments. The production information may define production characteristics of a well at different moments in the past. The production information may include time-series data of the production characteristics of the well.

The historical flowing bottom hole pressure component 106 may be configured to determine historical flowing bottom hole pressure of the well. Determining historical flowing bottom hole pressure may include ascertaining, approximating, calculating, establishing, estimating, finding, identifying, obtaining, performing, quantifying, and/or otherwise determining the historical flowing bottom hole pressure. Determining historical flowing bottom hole pressure may include determining values of flowing bottom hole pressure at one or more moments in the past. Determining historical flowing bottom hole pressure may include determining separate values of flowing bottom hole pressure at separate moments in the past.

The historical flowing bottom hole pressure of the well may be determined based on the operation characteristics of the well, the production characteristics of the well, and/or other information. The historical flowing bottom hole pressure of the well at a particular moment in the past may be determined based on the operation characteristics of the well at the particular moment in the past and/or the production characteristics of the well at the particular moment in the past. Time-series of the operation characteristics and/or the production characteristics may be used to determine times series of the historical flowing bottom hole pressure of the well.

In some implementations, the historical flowing bottom hole pressure of the well may be determined based on the operation characteristics of the well and/or the production characteristics of the well by inputting the operation characteristics of the well and/or the production characteristics of the well into one or more machine learning model. The machine learning model(s) may be configured (e.g., trained) to output the historical flowing bottom hole pressure of the well. In response to the operation characteristics of the well and/or the production characteristics of the well for a particular moment in the past being input into the machine learning model(s), the machine learning model(s) may output the historical flowing bottom hole pressure of the well at the particular moment in the past. The machine learning model(s) outputting the historical flowing bottom hole pressure of the well may include the machine learning model(s) outputting the value of the historical flowing bottom hole pressure and/or information from which the value of the historical flowing bottom hole pressure may be determined. The machine learning model(s) may output separate values of historical flowing bottom hole pressure of the well for separate moments in the past.

In some implementations, the machine learning model(s) may be trained based on fluid flow simulation of the well and/or other information. For example, the machine learning model(s) may be trained as described with respect to step 422 of FIG. 4. The machine learning model(s) may be used in place of fluid flow simulation to determine the historical flowing bottom hole pressure of the well. Use of the machine learning model(s) in place of fluid flow simulation may reduce the cost (e.g., time, computational power) of determining historical flowing bottom hole pressure of the well.

In some implementations, different machine learning models may be trained for use with different types and/or different combinations of input. For example, possible input to the machine learning model(s) for determination of historical flowing bottom hole pressure may include wellhead pressure, downhole pressure, casing head pressure, flowrate, temperature, well depth, true vertical depth, well location, reservoir thickness, oil rate, water rate, gas rate, gas/oil ratio, and cumulative production. Different machine learning models may be trained based on whether downhole pressure of the well is available or not. For example, certain wells may include a downhole pressure gauge, and downhole pressure of the well may be available. Certain wells may not include a downhole pressure gauge or the downhole pressure gauge may be down, and downhole pressure of the well may not be available. One machine learning model may be trained for input with downhole pressure and another machine learning model may be trained for input without downhole pressure. In some implementations, the machine learning model trained for input with downhole pressure may be more accurate in determination of historical flowing bottom hole pressure than the machine learning model trained for input without downhole pressure.

Figure 6A:
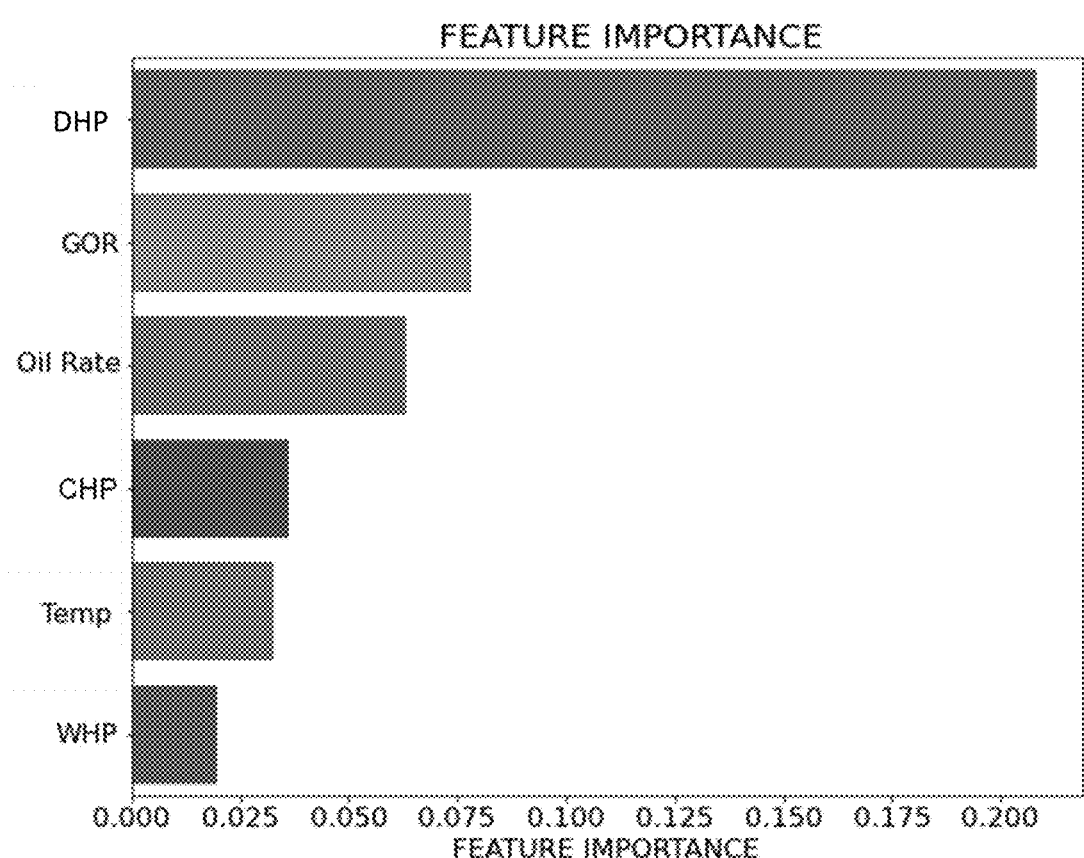
FIG. 6A illustrates example importance of features with downhole gauge pressure.
Figure 6B:
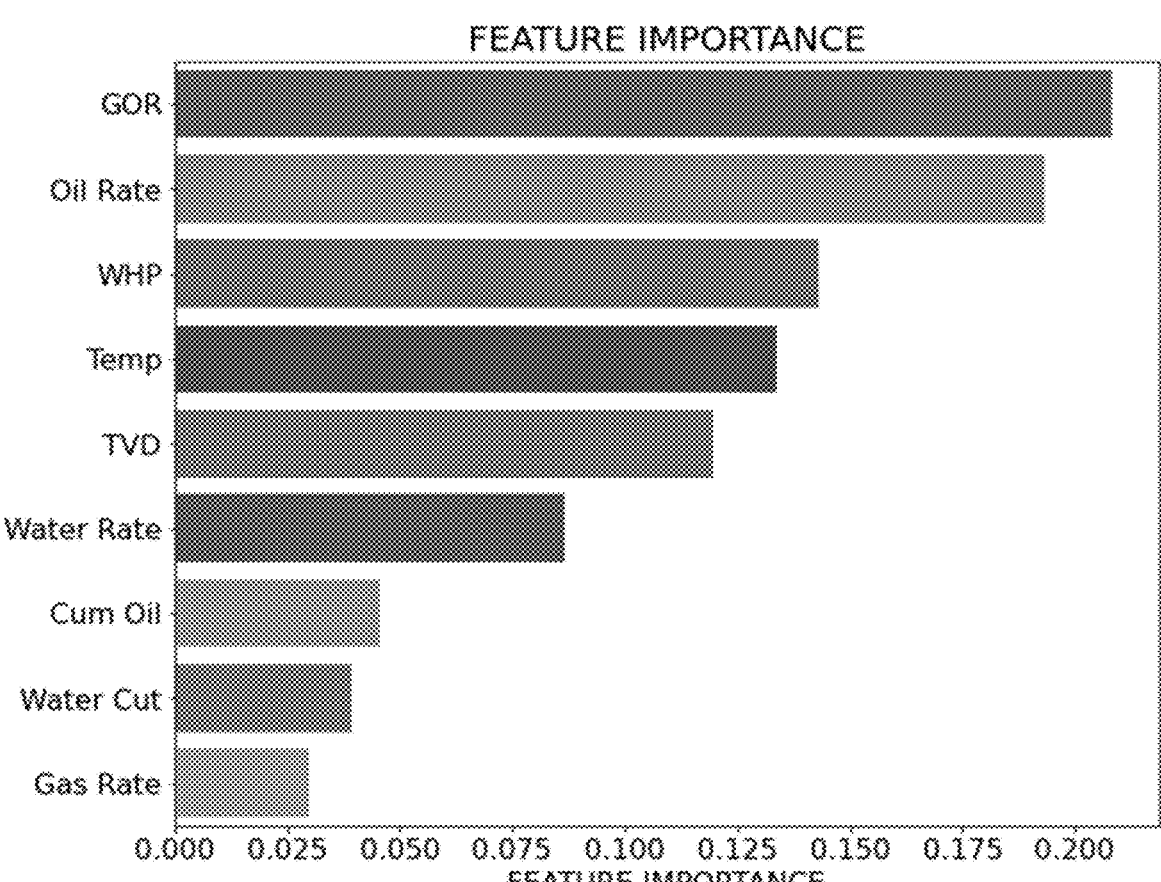
FIG. 6B illustrates example importance of features without downhole gauge pressure.

Different combinations of inputs may be used for different machine learning models. For example, the importance of different types of input (feature importance) may change between the machine learning model trained for input with downhole pressure and the machine learning model trained for input without downhole pressure. For example, FIG. 6A illustrates example importance of features for machine learning model trained for input with downhole gauge pressure while FIG. 6B illustrates example importance of features for machine learning model trained for input without downhole gauge pressure. As shown in FIG. 6A, the most important types of input for the machine learning model trained for input with downhole pressure may be, in order, downhole pressure, gas/oil ratio, oil rate, casing head pressure, temperature, and wellhead pressure. As shown in FIG. 6B, the most important types of input for the machine learning model trained for input without downhole pressure may be, in order, gas/oil ratio, oil rate, wellhead pressure, temperature, true vertical depth, water rate, cumulative oil production, water cut, and gas rate. Depending on the machine-learning model that is used, the input may be tailored to include the input types that are of greater importance.

The forecasted flowing bottom hole pressure component 108 may be configured to determine forecasted flowing bottom hole pressure of the well. Determining forecasted flowing bottom hole pressure may include ascertaining, approximating, calculating, establishing, estimating, finding, identifying, obtaining, performing, quantifying, and/or otherwise determining the forecasted flowing bottom hole pressure. Determining forecasted flowing bottom hole pressure may include determining values of flowing bottom hole pressure at one or more moments in the future. Determining forecasted flowing bottom hole pressure may include determining separate values of flowing bottom hole pressure at separate moments in the future.

The forecasted flowing bottom hole pressure of the well may be determined based on the historical flowing bottom hole pressure of the well and/or other information. The forecasted flowing bottom hole pressure of the well at multiple moments in the future may be determined based on the historical flowing bottom hole pressure of the well at multiple moments in the past. Time-series of the historical flowing bottom hole pressure of the well may be used to determine time-series of the forecasted flowing bottom hole pressure of the well.

In some implementations, the forecasted flowing bottom hole pressure of the well may be determined based on the historical flowing bottom hole pressure of the well using one or more analytical equations. The analytical equation(s) may be used to extrapolate values of forecasted flowing bottom hole pressure in the future based on values of historical flowing bottom hole pressure in the past. For example, the forecasted flowing bottom hole pressure of the well may be determined based on the historical flowing bottom hole pressure of the well using an exponential decline analysis and/or other analyses. For instance, a three-parameter exponential decline analysis may be used to fit a curve to the historical flowing bottom hole pressure and predict the forecasted flowing bottom hole pressure. The curve may be defined by the following function: $FBHP(t) = FBHP_i \times e^{a \times t^{exponent}}$, where $FBHP_i$ and $a$ are curve fitting parameters and $t$ is a duration of time (e.g., days). Use of other analysis is contemplated.

The forecasted production characteristics component 110 may be configured to determine forecasted production characteristics of the well. Determining forecasted production characteristics may include ascertaining, approximating, calculating, establishing, estimating, finding, identifying, obtaining, performing, quantifying, and/or otherwise determining the forecasted production characteristics. Determining forecasted production characteristics may include determining values of production characteristics at one or more moments in the future. Determining forecasted production characteristics may include determining separate values of production characteristics at separate moments in the future.

The forecasted production characteristics of the well may be determined based on the operation characteristics of the well, the production characteristics of the well, and/or other information. The forecasted production characteristics of the well at multiple moments in the future may be determined based on the operation characteristics of the well and/or the production characteristics of the well. Time-series of the operation characteristics of the well and/or the production characteristics of the well may be used to determine time-series of the forecasted production characteristics of the well.

In some implementations, the forecasted production characteristics of the well may be determined based on the production characteristics of the well using a curve fitting analysis and/or other analyses. Curve fitting analysis may be used to extrapolate values of forecasted production characteristics of the well in the future based on values of historical production characteristics of the well in the past. For example, the forecasted production characteristics of the well may be determined based on the production characteristics (historical production characteristics) of the well using a decline curve analysis and/or other analyses. For example, the values of production characteristics may be modeled using hyperbolic decline with terminal exponential decline. Separate analysis may be performed for separate production characteristics of the wells (e.g., separate analysis for oil rate and water rate). Use of other analysis is contemplated.

The forecasted drawdown pressure component 112 may be configured to determine forecasted drawdown pressure of the well. Determining forecasted drawdown pressure may include ascertaining, approximating, calculating, establishing, estimating, finding, identifying, obtaining, performing, quantifying, and/or otherwise determining the forecasted drawdown pressure. Determining forecasted drawdown pressure may include determining values of drawdown pressure at one or more moments in the future. Determining forecasted drawdown pressure may include determining separate values of drawdown pressure at separate moments in the future.

The forecasted drawdown pressure of the well may be determined based on the operation characteristics of the well, the production characteristics of the well, and/or other information. The forecasted drawdown pressure of the well at a particular moment in time may be determined based on the operation characteristics of the well at the particular moment in time and/or the production characteristics of the well at the particular moment in the past. Time-series of the operation characteristics and/or the production characteristics may be used to determine times series of the forecasted drawdown pressure of the well.

In some implementations, the forecasted drawdown pressure of the well may be determined based on the operation characteristics of the well and/or the production characteristics of the well by inputting the operation characteristics of the well and/or the production characteristics of the well into one or more machine learning models. The machine learning model(s) may be configured (e.g., trained) to output the forecasted drawdown pressure of the well. In response to the operation characteristics of the well and/or the production characteristics of the well for a particular moment in the future being input into the machine learning model(s), the machine learning model(s) may output the forecasted drawdown pressure of the well at the particular moment in the future. The machine learning model(s) outputting the forecasted drawdown pressure may include the machine learning model(s) outputting the value of forecasted drawdown pressure and/or information from which the value of the forecasted drawdown pressure may be determined. The machine learning model(s) may output separate values of forecasted drawdown pressure of the well for separate moments in the future.

In some implementations, the machine learning model may be trained based on shut-in simulation of the well and/or other information. For example, the machine learning model(s) may be trained as described with respect to step 428 of FIG. 4. The shut-in simulation of the well may simulate shut-in of the well for a single day and/or other time durations. In some implementations, the most important types of input for the machine learning model trained to output drawdown pressure may include, in order, oil rate, gas/oil ratio, water cut, and flowing bottom hole pressure.

The forecasted gas/oil ratio component 114 may be configured to determine forecasted gas/oil ratio of the well. Determining forecasted gas/oil ratio may include ascertaining, approximating, calculating, establishing, estimating, finding, identifying, obtaining, performing, quantifying, and/or otherwise determining the forecasted gas/oil ratio. Determining forecasted gas/oil ratio may include determining values of gas/oil ratio at one or more moments in the future. Determining forecasted gas/oil ratio may include determining separate values of gas/oil ratio at separate moments in the future.

The forecasted gas/oil ratio of the well may be determined based on the operation characteristics of the well, the production characteristics of the well, and/or other information. The forecasted gas/oil ratio of the well at a particular moment in time may be determined based on the operation characteristics of the well at the particular moment in time and/or the production characteristics of the well at the particular moment in the past. Time-series of the operation characteristics and/or the production characteristics may be used to determine times series of the forecasted gas/oil ratio of the well.

In some implementations, the forecasted gas/oil ratio of the well may be determined based on the operation characteristics of the well and/or the production characteristics of the well by inputting the operation characteristics of the well and/or the production characteristics of the well into one or more machine learning models. The machine learning model(s) may be configured (e.g., trained) to output the forecasted gas/oil ratio of the well. In response to the operation characteristics of the well and/or the production characteristics of the well for a particular moment in the future being input into the machine learning model(s), the machine learning model(s) may output the forecasted gas/oil ratio of the well at the particular moment in the future. The machine learning model(s) outputting the forecasted gas/oil ratio may include the machine learning model(s) outputting the value of forecasted gas/oil ratio and/or information from which the value of the forecasted gas/oil ratio may be determined. The machine learning model(s) may output separate values of forecasted gas/oil ratio of the well for separate moments in the future.

In some implementations, the machine learning model(s) may be trained based on fluid flow simulation of the well and/or other information. For example, the machine learning model(s) may be trained as described with respect to step 430 of FIG. 4. The machine learning model(s) may be used in place of fluid flow simulation to determine the forecasted gas/oil ratio of the well. Use of the machine learning model(s) in place of fluid flow simulation may reduce the cost (e.g., time, computational power) of determining forecasted gas/oil ratio of the well. In some implementations, the input to the machine learning model(s) trained to output gas/oil ratio may include dynamic production-related attributes (e.g., production rates, pressure profiles) and/or static features encompassing reservoir and/or rock properties. For example, the input to the machine learning model(s) trained to output gas/oil ratio may include water cut, oil rate, cumulative oil production, flowing bottom hole pressure, and/or surface latitude.

The production parameters component 116 may be configured to determine production parameters for the well. Determining production parameters may include ascertaining, approximating, calculating, establishing, estimating, finding, identifying, obtaining, performing, quantifying, and/or otherwise determining the production parameters. Determining production parameters may include determining types and/or values of production parameters.

The production parameters for the well may be determined based on the forecasted flowing bottom hole pressure of the well, the forecasted production characteristics of the well, the forecasted drawdown pressure of the well, the forecasted gas/oil ratio of the well, and/or other information. The production parameters for the well at a particular moment in the future may be determined based on the forecasted flowing bottom hole pressure of the well, the forecasted production characteristics of the well (e.g., oil rate, water rate), the forecasted drawdown pressure of the well, and/or the forecasted gas/oil ratio of the well at the particular moment in the future. The production parameters for the well at multiple moments in the future may be determined based on the forecasted flowing bottom hole pressure of the well, the forecasted production characteristics of the well, the forecasted drawdown pressure of the well, and/or the forecasted gas/oil ratio of the well at the multiple movements in the future.

Production parameters for a well may refer to parameters (e.g., characteristics, factors, features, configurations, settings) that control, affect, reflect, and/or otherwise determine production from the well. Production parameters for a well may refer to parameters that control, affect, reflect, and/or otherwise determine how materials are produced using the well. In some implementations, the production parameters for the well may include shut-in bottom hole pressure. The shut-in bottom hole pressure of the well may serve as proxy for reservoir pressure in the unconventional reservoir. The production parameters for the well may further include water cut and productivity index. Other determined values may be used as production parameters for the well. For example, the production parameters for the well may include gas/oil ratio, flowing bottom hole pressure, and/or other determined values.

Production parameters for a well may be determined using one or more calculations. For example, the gas rate ($Q_G$) of a well may be determined based on the gas/oil ratio and the oil rate of the well. The gas rate of the well may be determined as the product of the gas/oil ratio and the oil rate of the well. The water cut of the well may be determined based on the water rate and the oil rate of the well. The water cut of the well may be determined as the ratio of the water rate to the sum of the oil rate and the water rate of the well. The shut-in bottom hole pressure (SBHP) of the well may be determined based on the flowing bottom hole pressure and the drawdown pressure of the well. The shut-in bottom hole pressure of the well may be determined as the sum of the flowing bottom hole pressure and the drawdown pressure of the well. The productivity index (PI) of the well may be determined based on the oil rate, the water rate, and the drawdown pressure of the well. The productivity index of the well may be determined as the ratio of the sum of the oil rate and the water rate to the drawdown pressure the of the well. Other calculation of production parameters is contemplated.

FIG. 7A illustrates example determination of rates and GOR/water cut. Dots in FIG. 7A may show historical oil rate, gas rate, water rate, gas/oil ratio, and water cut of a well for a two year period. Oil rate, gas rate, water rate, gas/oil ratio, and water cut of the well may be forecasted for 28 years in the future using the techniques described herein. FIG. 7B illustrates example determination of pressures and productivity index. Dots in FIG. 7B may show historical flowing bottom hole pressure, shut-in bottom hole pressure, drawdown pressure, and productivity index for a well for a two year period. Flowing bottom hole pressure, shut-in bottom hole pressure, drawdown pressure, and productivity index of the well may be forecasted for 28 years in the future using the techniques described here. The forecasted data may be used to facilitate operation(s) of the well.

The operation component 118 may be configured to facilitate one or more operations of the well. The operation(s) of the well may be facilitated based on and/or other information. Facilitating an operation of a well may include carrying out, controlling, initiating, performing, scheduling, setting up, and/or otherwise facilitating the operation of the well. For example, facilitating an operation of a well may include determining, setting, and/or modifying one or more setpoints/parameters in how the well is operated. The operations of the well may be performed based on the production parameters for the well and/or other information. For example, the gas/oil ratio, the water cut, the flowing bottom hole pressure, the shut-in bottom hole pressure, and/or the productivity index may be used to set/modify the setpoints/parameters in how the well is operated. For instance, the setpoints/parameters may be set/modified to improve (e.g., increase efficiency of, optimize) well operations. The setpoints/parameters determined by the operation component 118 may be used to automatically control how the well is operated.

In some implementations, facilitation of the operation(s) of the well based on the production parameters for the well may include determination of artificial lift parameters for the well (e.g., gas lift injection rate, gas lift allocation, diluent injection, parameters of pumps, such as electrical submersible pumps, progressive cavity pumps, rod pumps, sucker rod pumps, jet pumps, hydraulic drive downhole pumps, multiphase pumps) based on the production parameters for the well and/or other information. The production parameters for the well may be used for production optimization (e.g., increasing/maximizing oil/gas production), drawdown management (e.g., increasing/maximizing estimated ultimate recovery), reservoir management (e.g., capacity management, controlling/adjusting load of different wells based on inflow performance relationships of the wells, reducing/eliminating loss production opportunity), and/or other operation of the well. The production parameters for the well may be used for production/well design (e.g., determining designs of artificial lift components, such as gas lift value, spacing, depth, pressure setting, pump size, motor type). In some implementations, facilitation of the operation(s) of the well based on the production parameters for the well may include determination of inflow performance relationship of the well based on the production parameters for the well and/or other information, and use of the inflow performance relationship of the well to facilitate operation(s) of the well.

In some implementations, the production parameters for the well and/or information determined from the production parameters for the well may be visually provided and/or presented to one or more users in controlling the operation of the well. For example, optimized setpoints/parameters for the wells may be communicated to an operator and/or presented on the electronic display 14. Other related information may be communicated to an operator and/or presented on the electronic display 14.

In some implementations, the production parameters for the well and/or information determined from the production parameters for the well may be audibly provided and/or played back to one or more users in controlling the operation of the well. For example, optimized setpoints/parameters for the wells may be audibly communicated to an operator and/or played on one or more speakers (e.g., loudspeaker, headphone). Other related information may be audibly communicated to an operator and/or played back on the speaker(s). In some implementations, information may be both visually and audibly provided to the user(s). For example, a user may be wearing a headset or holding a mobile device including a display and a speaker. Instructions for the well may be presented on the display and played out loud by the speaker.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the electronic display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2A and FIG. 2B illustrate methods 200, 250 for controlling well operations in unconventional reservoirs. The operations of methods 200, 250 presented below are intended to be illustrative. In some implementations, methods 200, 250 may be accomplished with one or more additional operations not described, and/or without one or more of the operations discussed. In some implementations, two or more of the operations may occur substantially simultaneously.

In some implementations, methods 200, 250 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information. The one or more processing devices may include one or more devices executing some or all of the operations of methods 200, 250 in response to instructions stored electronically on one or more electronic storage media. The one or more processing devices may include one or more devices configured through hardware, firmware, and/or software to be specifically designed for execution of one or more of the operations of methods 200, 250.

Referring to FIG. 2A and method 200, at operation 202, operation information for a well in an unconventional reservoir may be obtained. The operation information may define operation characteristics of the well. In some implementations, operation 202 may be performed by a processor component the same as or similar to the operation information component 102 (Shown in FIG. 1 and described herein).

At operation 204, production information for the well may be obtained. The production information may define production characteristics of the well. In some implementations, operation 204 may be performed by a processor component the same as or similar to the production information component 104 (Shown in FIG. 1 and described herein).

At operation 206, historical flowing bottom hole pressure of the well may be determined based on the operation characteristics of the well, the production characteristics of the well, and/or other information. In some implementations, operation 206 may be performed by a processor component the same as or similar to the historical flowing bottom hole pressure component 106 (Shown in FIG. 1 and described herein).

At operation 208, forecasted flowing bottom hole pressure of the well may be determined based on the historical flowing bottom hole pressure of the well and/or other information. In some implementations, operation 208 may be performed by a processor component the same as or similar to the forecasted flowing bottom hole pressure component 108 (Shown in FIG. 1 and described herein).

At operation 210, forecasted production characteristics of the well may be determined based on the operation characteristics of the well, the production characteristics of the well, and/or other information. In some implementations, operation 210 may be performed by a processor component the same as or similar to the forecasted production characteristics component 110 (Shown in FIG. 1 and described herein).

Referring to FIG. 2B and method 250, at operation 252, forecasted drawdown pressure of the well may be determined based on the operation characteristics of the well, the production characteristics of the well, and/or other information. In some implementations, operation 252 may be performed by a processor component the same as or similar to the forecasted drawdown pressure component 112 (Shown in FIG. 1 and described herein).

At operation 254, forecasted gas/oil ratio of the well may be determined based on the operation characteristics of the well, the production characteristics of the well, and/or other information. In some implementations, operation 254 may be performed by a processor component the same as or similar to the forecasted gas/oil ratio component 114 (Shown in FIG. 1 and described herein).

At operation 256, production parameters for the well may be determined based on the forecasted flowing bottom hole pressure of the well, the forecasted production characteristics of the well, the forecasted drawdown pressure of the well, the forecasted gas/oil ratio of the well, and/or other information. The production parameters for the well may include shut-in bottom hole pressure that serves as proxy for reservoir pressure in the unconventional reservoir. In some implementations, operation 256 may be performed by a processor component the same as or similar to the production parameters component 116 (Shown in FIG. 1 and described herein).

At operation 258, one or more operations of the well may be facilitated based on the production parameters for the well and/or other information. In some implementations, operation 258 may be performed by a processor component the same as or similar to the operation component 118 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for controlling well operations in unconventional reservoirs, the system comprising:
   one or more physical processors configured by machine-readable instructions to:
   obtain operation information for a well in an unconventional reservoir, the operation information defining operation characteristics of the well;
   obtain production information for the well, the production information defining production characteristics of the well;
   determine historical flowing bottom hole pressure of the well based on the operation characteristics of the well and/or the production characteristics of the well;
   determine forecasted flowing bottom hole pressure of the well based on the historical flowing bottom hole pressure of the well;
   determine forecasted production characteristics of the well based on the operation characteristics of the well and/or the production characteristics of the well;
   determine forecasted drawdown pressure of the well based on the operation characteristics of the well and/or the production characteristics of the well;
   determine forecasted gas/oil ratio of the well based on the operation characteristics of the well and/or the production characteristics of the well;
   determine production parameters for the well based on the forecasted flowing bottom hole pressure of the well, the forecasted production characteristics of the well, the forecasted drawdown pressure of the well, and the forecasted gas/oil ratio of the well, the production parameters for the well including shut-in bottom hole pressure that serves as proxy for reservoir pressure in the unconventional reservoir; and
   facilitate one or more operations of the well based on the production parameters for the well.

2. The system of claim 1, wherein the historical flowing bottom hole pressure of the well is determined based on the operation characteristics of the well and/or the production characteristics of the well by inputting the operation characteristics of the well and/or the production characteristics of the well into a machine learning model, the machine learning model configured to output the historical flowing bottom hole pressure of the well.

3. The system of claim 2, wherein the machine learning model is trained based on fluid flow simulation of the well.

4. The system of claim 1, wherein the forecasted flowing bottom hole pressure of the well is determined based on the historical flowing bottom hole pressure of the well using an exponential decline analysis.

5. The system of claim 1, wherein the forecasted production characteristics of the well are determined based on the production characteristics of the well using a decline curve analysis.

6. The system of claim 1, wherein the forecasted drawdown pressure of the well is determined based on the operation characteristics of the well and/or the production characteristics of the well by inputting the operation characteristics of the well and/or the production characteristics of the well into a machine learning model, the machine learning model configured to output the forecasted drawdown pressure of the well.

7. The system of claim 6, wherein the machine learning model is trained based on shut-in simulation of the well.

8. The system of claim 7, wherein the shut-in simulation of the well simulates shut-in of the well for a single day.

9. The system of claim 1, wherein the production parameters for the well further include water cut and productivity index.

10. The system of claim 1, wherein facilitation of the one or more operations of the well based on the production parameters for the well includes determination of artificial lift parameters for the well based on the production parameters for the well.

11. A method for controlling well operations in unconventional reservoirs, the method comprising:

obtaining operation information for a well in an unconventional reservoir, the operation information defining operation characteristics of the well;

obtaining production information for the well, the production information defining production characteristics of the well;

determining historical flowing bottom hole pressure of the well based on the operation characteristics of the well and/or the production characteristics of the well;

determining forecasted flowing bottom hole pressure of the well based on the historical flowing bottom hole pressure of the well;

determining forecasted production characteristics of the well based on the operation characteristics of the well and/or the production characteristics of the well;

determining forecasted drawdown pressure of the well based on the operation characteristics of the well and/or the production characteristics of the well;

determining forecasted gas/oil ratio of the well based on the operation characteristics of the well and/or the production characteristics of the well;

determining production parameters for the well based on the forecasted flowing bottom hole pressure of the well, the forecasted production characteristics of the well, the forecasted drawdown pressure of the well, and the forecasted gas/oil ratio of the well, the production parameters for the well including shut-in bottom hole pressure that serves as proxy for reservoir pressure in the unconventional reservoir; and facilitating one or more operations of the well based on the production parameters for the well.

12. The method of claim 11, wherein the historical flowing bottom hole pressure of the well is determined based on the operation characteristics of the well and/or the production characteristics of the well by inputting the operation characteristics of the well and/or the production characteristics of the well into a machine learning model, the machine learning model configured to output the historical flowing bottom hole pressure of the well.

13. The method of claim 12, wherein the machine learning model is trained based on fluid flow simulation of the well.

14. The method of claim 11, wherein the forecasted flowing bottom hole pressure of the well is determined based on the historical flowing bottom hole pressure of the well using an exponential decline analysis.

15. The method of claim 11, wherein the forecasted production characteristics of the well are determined based on the production characteristics of the well using a decline curve analysis.

16. The method of claim 11, wherein the forecasted drawdown pressure of the well is determined based on the operation characteristics of the well and/or the production characteristics of the well by inputting the operation characteristics of the well and/or the production characteristics of the well into a machine learning model, the machine learning model configured to output the forecasted drawdown pressure of the well.

17. The method of claim 16, wherein the machine learning model is trained based on shut-in simulation of the well.

18. The method of claim 17, wherein the shut-in simulation of the well simulates shut-in of the well for a single day.

19. The method of claim 11, wherein the production parameters for the well further include water cut and productivity index.

20. The method of claim 11, wherein facilitating the one or more operations of the well based on the production parameters for the well includes determining artificial lift parameters for the well based on the production parameters for the well.

* * * * *